US012560999B2

(12) United States Patent
Enoki et al.

(10) Patent No.: US 12,560,999 B2
(45) Date of Patent: Feb. 24, 2026

(54) IMAGE PROCESSING APPARATUS, IMAGE PROCESSING METHOD, AND SURGICAL MICROSCOPE SYSTEM

(71) Applicant: Sony Group Corporation, Tokyo (JP)

(72) Inventors: Junichiro Enoki, Tokyo (JP); Izumu Hosoi, Tokyo (JP); Yuki Sugie, Tokyo (JP); Tomoyuki Ootsuki, Tokyo (JP); Koji Kashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 88 days.

(21) Appl. No.: 18/261,270

(22) PCT Filed: Dec. 16, 2021

(86) PCT No.: PCT/JP2021/046453
§ 371 (c)(1),
(2) Date: Jul. 13, 2023

(87) PCT Pub. No.: WO2022/163189
PCT Pub. Date: Aug. 4, 2022

(65) Prior Publication Data
US 2024/0302896 A1     Sep. 12, 2024

(30) Foreign Application Priority Data

Jan. 29, 2021   (JP) ................................. 2021-013641
Feb. 26, 2021   (JP) ................................. 2021-031260

(51) Int. Cl.
*G06F 3/01*          (2006.01)
*G02B 21/00*         (2006.01)
(Continued)

(52) U.S. Cl.
CPC ......... *G06F 3/013* (2013.01); *G02B 21/0012* (2013.01); *G02B 21/367* (2013.01);
(Continued)

(58) Field of Classification Search
CPC ....................................................... G06F 3/013
(Continued)

(56) References Cited

U.S. PATENT DOCUMENTS 5,963,183 A * 10/1999 Takahashi .............. G09G 5/391
                                                                715/717
11,389,304 B1 * 7/2022 Nikou .................... A61B 34/25
(Continued)

FOREIGN PATENT DOCUMENTS

JP          H07-204210 A       8/1995
JP          H09-140671 A       6/1997
(Continued)

OTHER PUBLICATIONS

International Search Report and Written Opinion mailed on Feb. 22, 2022, received for PCT Application PCT/JP2021/046453, filed on Dec. 16, 2021, 12 pages including English Translation.
(Continued)

*Primary Examiner* — Leron Beck
(74) *Attorney, Agent, or Firm* — XSENSUS LLP

(57)                ABSTRACT

An image processing apparatus (13) according to an aspect of the present disclosure includes: an image input unit (13*b*) that receives an operative field image for an eye of a patient; an eyeball tracking unit (13*e*) that tracks an eyeball in the operative field image; and a display image generation unit (13*f*) that sets a plurality of regions having different display modes for the operative field image and generates a display image in which a boundary of the plurality of regions indicate at least one of a specific position, a specific direction, and a specific size for the eye, in which the display image generation unit (13*f*) changes a display mode of any or all of the plurality of regions on the basis of a tracking result of the eyeball, and changes at least one of a position, a direction, and a size of the boundary.

21 Claims, 27 Drawing Sheets

(51) Int. Cl.

| | | |
|---|---|---|
| *G02B 21/36* | (2006.01) | |
| *G06T 7/73* | (2017.01) | |

(52) U.S. Cl.
CPC .............. *G02B 21/368* (2013.01); *G06T 7/73* (2017.01); *G06T 2200/04* (2013.01); *G06T 2207/10012* (2013.01); *G06T 2207/30041* (2013.01)

(58) Field of Classification Search
USPC .......................................................... 348/51
See application file for complete search history.

(56) References Cited

U.S. PATENT DOCUMENTS

| | | | | |
|---|---|---|---|---|
| 2001/0027272 | A1* | 10/2001 | Saito .................... | A61B 1/0005 |
| | | | | 600/429 |
| 2003/0009156 | A1* | 1/2003 | Levine ................... | A61B 3/103 |
| | | | | 606/5 |
| 2010/0082017 | A1* | 4/2010 | Zickler ................ | A61F 2/1624 |
| | | | | 606/4 |
| 2011/0230751 | A1* | 9/2011 | Kersting .............. | A61B 3/0025 |
| | | | | 600/407 |
| 2013/0195340 | A1* | 8/2013 | Iwase ................... | A61B 3/0025 |
| | | | | 382/131 |
| 2015/0123997 | A1* | 5/2015 | Hayasaka .......... | G02B 27/0101 |
| | | | | 345/633 |
| 2015/0272431 | A1* | 10/2015 | Fujii ...................... | A61B 3/005 |
| | | | | 600/425 |
| 2016/0234488 | A1* | 8/2016 | Zhao .................... | H04N 13/398 |
| 2017/0020627 | A1* | 1/2017 | Tesar ................... | A61B 90/361 |
| 2017/0143442 | A1* | 5/2017 | Tesar ..................... | A61B 90/37 |
| 2017/0221203 | A1* | 8/2017 | Iwase ................... | G06V 40/193 |
| 2017/0273558 | A1* | 9/2017 | Tamura ................. | G16H 30/20 |
| 2018/0116501 | A1* | 5/2018 | Akiba .................... | G01N 21/17 |
| 2018/0217429 | A1* | 8/2018 | Busch .................... | G02F 1/076 |
| 2019/0015163 | A1 | 1/2019 | Abhari et al. | |
| 2019/0099226 | A1 | 4/2019 | Hallen | |
| 2019/0167474 | A1* | 6/2019 | Artsyukhovich ..... | A61F 2/1662 |
| 2019/0328225 | A1* | 10/2019 | Enoki .................... | G02B 21/06 |
| 2019/0328532 | A1* | 10/2019 | Nakasuji ................ | G16H 20/40 |
| 2020/0029805 | A1* | 1/2020 | Seesselberg .......... | A61B 3/103 |
| 2021/0132795 | A1* | 5/2021 | Kurbanova ........ | G06F 3/04886 |
| 2021/0382559 | A1* | 12/2021 | Segev ..................... | G06F 3/013 |
| 2022/0206569 | A1* | 6/2022 | Akisada ................. | G08B 21/18 |
| 2023/0009290 | A1* | 1/2023 | Iwasaki ................... | G09G 5/02 |
| 2023/0293239 | A1* | 9/2023 | Hill ........................ | G16H 50/50 |
| | | | | 700/97 |

FOREIGN PATENT DOCUMENTS

| | | |
|---|---|---|
| JP | 2002-328294 A | 11/2002 |
| JP | 2006-136714 A | 6/2006 |
| JP | 2008-022928 A | 2/2008 |
| JP | 2011-200667 A | 10/2011 |
| JP | 2012-030054 A | 2/2012 |
| JP | 2012-506272 A | 3/2012 |
| JP | 2012-152469 A | 8/2012 |
| JP | 2013-509273 A | 3/2013 |
| JP | 2015-033650 A | 2/2015 |
| JP | 2016-073409 A | 5/2016 |
| JP | 2016-112358 A | 6/2016 |
| JP | 2016-214781 A | 12/2016 |
| JP | 2018-051208 A | 4/2018 |
| JP | 2019-502415 A | 1/2019 |
| JP | 2020-506763 A | 3/2020 |
| JP | 2020-524061 A | 8/2020 |
| WO | 2016/190113 A1 | 12/2016 |
| WO | WO-2018105411 A1 | 6/2018 |

OTHER PUBLICATIONS

Miyata et al., "Color Splitting Micro-metalenses for High-sensitivity Color Image Sensors", Conference on Lasers and Electro-Optics (CLEO), 2021, 2 pages.

* cited by examiner

IMAGE PROCESSING APPARATUS, IMAGE PROCESSING METHOD, AND SURGICAL MICROSCOPE SYSTEM

CROSS-REFERENCE TO RELATED APPLICATIONS

This application is based on PCT filing PCT/JP2021/046453, filed Dec. 16, 2021, which claims priority to Japanese Application No. 2021-013641, filed Jan. 29, 2021, and Japanese Application No. 2021-031260, filed Feb. 26, 2021, the entire contents of each are incorporated herein by reference.

FIELD

The present disclosure relates to an image processing apparatus, an image processing method, and a surgical microscope system.

BACKGROUND

As a refractive correction method in ophthalmology, it is widely practiced to eliminate refractive abnormality of a crystalline lens or the like and improve a visual function such as visual acuity by inserting an artificial lens called an intraocular lens (IOL) into an eye. As the intraocular lens, an intraocular lens inserted into a lens capsule is most widely used as a substitute for a lens removed by a cataract operation. In addition to the lens capsule, there are various intraocular lenses such as those fixed (indwelled) in a ciliary sulcus or the like (Phakic IOL).

When performing ophthalmic surgery such as cataract surgery, in order to improve the visual function after surgery, the operator performs the operation so that an incision position and an incision shape, and a posture of the implant such as an intraocular lens to be inserted with respect to the eye become appropriate in light of the preoperative plan. At this time, it is desired to present information regarding an appropriate incision position, incision shape, implant posture, and the like in a form that facilitates the operation for the operator. Therefore, Patent Literature 1 proposes a technique of changing a position of a mark (pattern) indicating a preoperative plan according to a result of eyeball tracking.

CITATION LIST

Patent Literature

Patent Literature 1: JP 2016-112358 A

SUMMARY

Technical Problem

However, since the mark based on the preoperative plan is superimposed on an operative field image, occlusion (shielding) in which a part of the operative field image is invisible by the mark occurs. For this reason, since it is difficult for the operator to see the operative field image, it is difficult to realize the operation according to the preoperative plan with high accuracy.

Therefore, the present disclosure proposes an image processing apparatus, an image processing method, and a surgical microscope system capable of realizing surgery according to a preoperative plan with high accuracy.

Solution to Problem

An image processing apparatus according to the embodiment of the present disclosure includes: an image input unit that receives an operative field image for an eye of a patient; an eyeball tracking unit that tracks an eyeball in the operative field image; and a display image generation unit that sets a plurality of regions having different display modes for the operative field image and generates a display image in which a boundary of the plurality of regions indicates at least one of a specific position, a specific direction, and a specific size with respect to the eye, wherein the display image generation unit changes a display mode of any or all of the plurality of regions based on a tracking result of the eyeball, and changes at least one of a position, a direction, and a size of the boundary.

An image processing method according to the embodiment of the present disclosure performed by an image processing apparatus, the method includes: receiving an operative field image for an eye of a patient; tracking an eyeball in the operative field image; and setting a plurality of regions having different display modes for the operative field image and generating a display image in which a boundary of the plurality of regions indicates at least one of a specific position, a specific direction, and a specific size with respect to the eye, wherein the image processing apparatus changes a display mode of any or all of the plurality of regions based on a tracking result of the eyeball, and changes at least one of a position, a direction, and a size of the boundary.

A surgical microscope system according to the embodiment of the present disclosure includes: a surgical microscope that obtains an operative field image for an eye of a patient; an image processing apparatus that generates a display image; and a display device that displays the display image, wherein the image processing apparatus includes: an image input unit that receives the operative field image; an eyeball tracking unit that tracks an eyeball in the operative field image; and a display image generation unit that sets a plurality of regions having different display modes for the operative field image and generates the display image in which a boundary of the plurality of regions indicates at least one of a specific position, a specific direction, and a specific size with respect to the eye, and the display image generation unit changes a display mode of any or all of the plurality of regions based on a tracking result of the eyeball, and changes at least one of a position, a direction, and a size of the boundary.

BRIEF DESCRIPTION OF DRAWINGS

FIG. 5 is a first diagram for explaining display image generation according to the embodiment of the present disclosure.

FIG. 14 is a diagram illustrating Example 9 of a display image according to the embodiment of the present disclosure.

FIG. 15 is a diagram illustrating Example 10 of a display image according to the embodiment of the present disclosure.

FIG. 16 is a diagram illustrating Example 11 of a display image according to the embodiment of the present disclosure.

FIG. 26 is a diagram illustrating Example 15 of a display image according to the embodiment of the present disclosure.

FIG. 28 is a second diagram illustrating Example 16 of the display image according to the embodiment of the present disclosure.

DESCRIPTION OF EMBODIMENTS

Hereinafter, embodiments of the present disclosure will be described in detail with reference to the drawings. Note that the apparatus, method, system, and the like according to the present disclosure are not limited by this embodiment. Furthermore, in each of the following embodiments, basically the same parts are denoted by the same reference signs, and redundant description is omitted.

One or a plurality of embodiments (including examples and modification examples) described below can each be implemented independently. On the other hand, at least some of the plurality of embodiments described below may be implemented by being appropriately combined with at least some of other embodiments. The plurality of embodiments may include novel features different from each other. Therefore, the plurality of embodiments can contribute to solving different objects or problems, and can exhibit different effects.

The present disclosure will be described according to the following order of items shown below.

1. Embodiment
1-1. Example of schematic configuration of surgical microscope system
1-2. Example of schematic configuration of surgical microscope
1-3. Example of schematic configuration of image processing apparatus and image processing
1-4. Working and effect
2. Example of schematic configuration of computer
3. Supplementary note 1. Embodiment <1-1. Example of Schematic Configuration of Surgical Microscope System>

Figure 1:
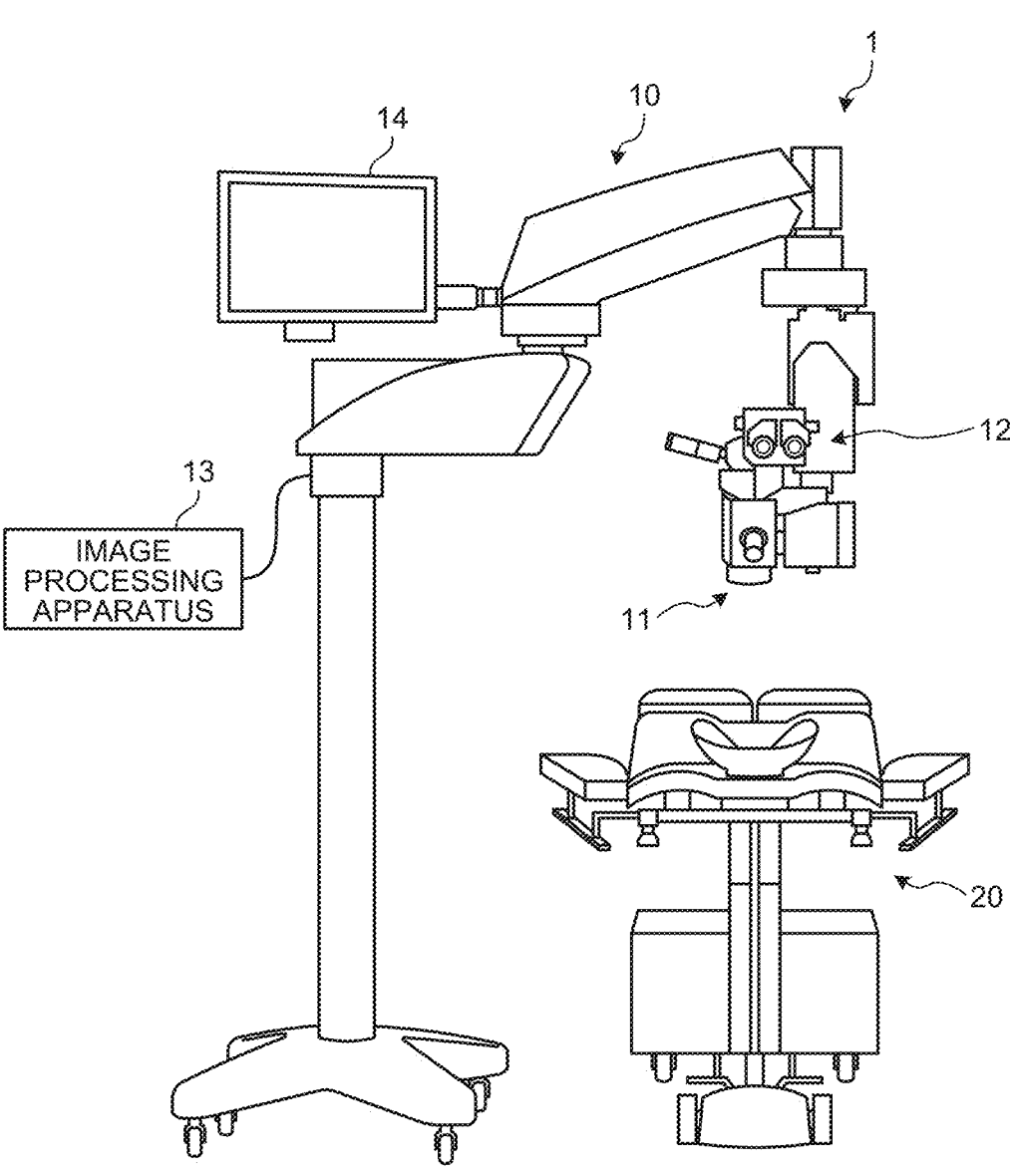
FIG. 1 is a diagram illustrating an example of a schematic configuration of a surgical microscope system according to an embodiment of the present disclosure.

An example of a schematic configuration of a surgical microscope system 1 according to an embodiment will be described with reference to FIG. 1. FIG. 1 is a diagram illustrating an example of a schematic configuration of the surgical microscope system 1 according to an embodiment.

As illustrated in FIG. 1, the surgical microscope system 1 includes a surgical microscope 10 and a patient bed 20. The surgical microscope system 1 is a system used for eye surgery. A patient undergoes eye surgery while lying on the patient bed 20. Furthermore, an operator who is a doctor performs surgery while observing the eye of the patient with the surgical microscope 10.

The surgical microscope 10 includes an objective lens 11, an eyepiece lens 12, an image processing apparatus 13, and a monitor 14.

The objective lens 11 and the eyepiece lens 12 are lenses for magnifying and observing the eye of a patient to be operated.

The image processing apparatus 13 performs predetermined image processing on an image captured via the objective lens 11 to output various images, various types of information, and the like.

The monitor 14 displays an image captured through the objective lens 11, various images, various information, and the like generated by the image processing apparatus 13. The monitor 14 may be provided separately from the surgical microscope 10.

In the surgical microscope system 1, for example, an operator performs surgery while looking through the eyepiece lens 12 and observing the eye of the patient through the objective lens 11. Furthermore, the operator performs surgery while confirming an operative field image and various images (for example, an image before image processing, an image after image processing, or the like), various types of information, and the like displayed on the monitor 14. Note that it is also possible to perform surgery using an image of only the monitor 14.

<1-2. Example of Schematic Configuration of Surgical Microscope>

Figure 2:
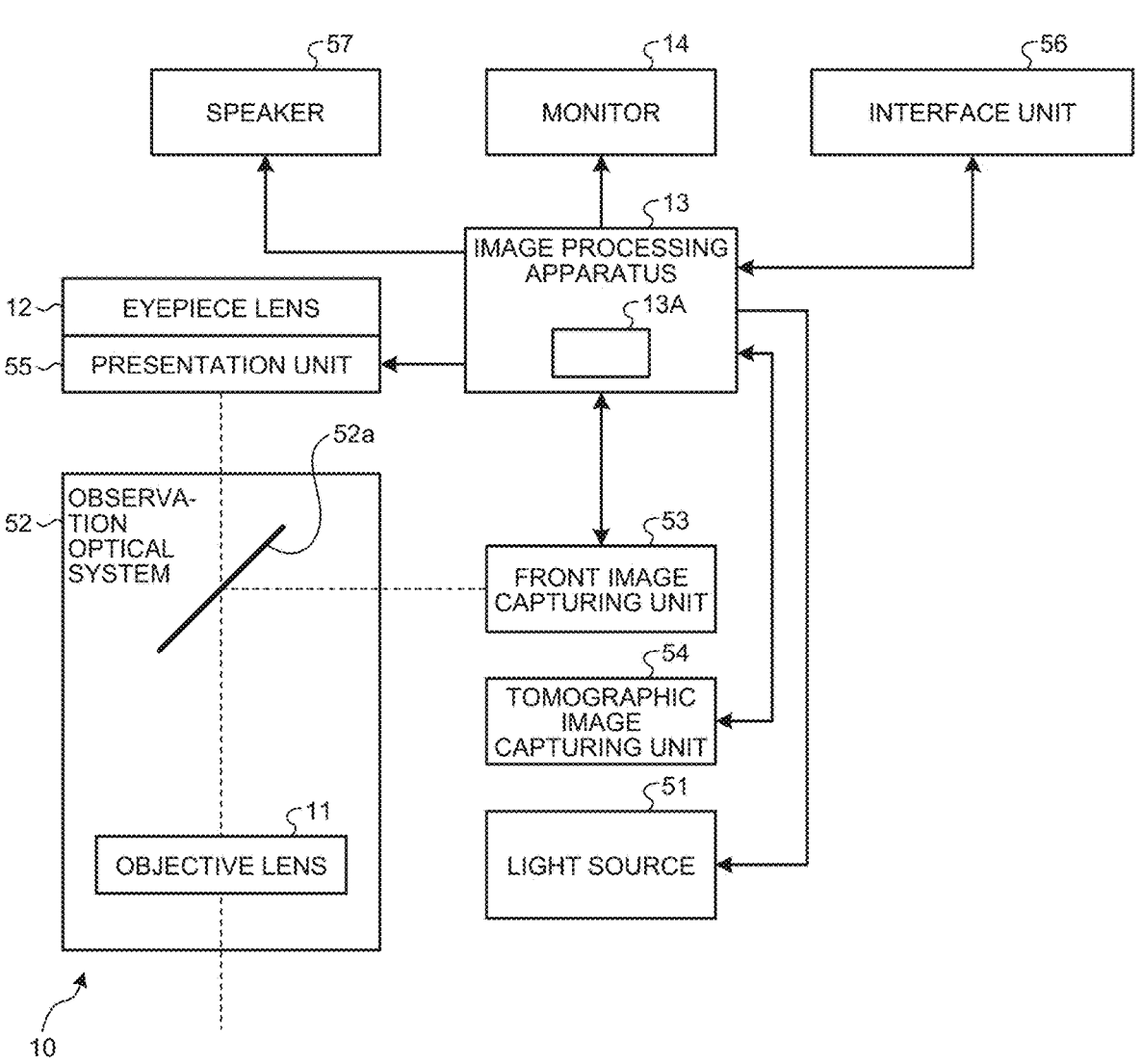
FIG. 2 is a diagram illustrating an example of a schematic configuration of a surgical microscope according to the embodiment of the present disclosure.

An example of a schematic configuration of the surgical microscope 10 according to the embodiment will be described with reference to FIG. 2. FIG. 2 is a diagram illustrating an example of a schematic configuration of the surgical microscope 10 according to the embodiment.

As illustrated in FIG. 2, the surgical microscope 10 includes a light source 51, an observation optical system 52, a front image capturing unit 53, a tomographic image capturing unit 54, a presentation unit 55, an interface unit 56, and a speaker 57 in addition to the objective lens 11, the eyepiece lens 12, the image processing apparatus 13, and the monitor 14. Note that the monitor 14 and the presentation unit 55 correspond to a display device.

The light source 51 emits illumination light under the control of a control unit 13A included in the image processing apparatus 13 to illuminate the eye of the patient.

The observation optical system 52 includes, for example, optical elements such as the objective lens 11, a half mirror 52*a*, and a lens (not illustrated). The observation optical system 52 guides light (observation light) reflected from the eye of the patient to the eyepiece lens 12 and the front image capturing unit 53.

Specifically, the light reflected from the eye of the patient enters the half mirror 52*a* via the objective lens 11, a lens (not illustrated), or the like as observation light. Approximately half of the observation light incident on the half mirror 52*a* passes through the half mirror 52*a* as it is, and is incident on the eyepiece lens 12 via the transmissive presentation unit 55. On the other hand, the remaining half of the observation light incident on the half mirror 52*a* is reflected by the half mirror 52*a* and is incident on the front image capturing unit 53.

The front image capturing unit 53 includes, for example, a video camera or the like. The front image capturing unit 53 receives and photoelectrically converts the observation light incident from the observation optical system 52, thereby capturing an image of the eye of the patient observed from the front, that is, a front image which is an image obtained by capturing the eye of the patient substantially from an eye axis direction. The front image capturing unit 53 captures (images) a front image under the control of the image processing apparatus 13, and supplies the obtained front image to the image processing apparatus 13.

The tomographic image capturing unit 54 includes, for example, an optical coherence tomography (OCT), a scheimpflug camera, or the like. The tomographic image capturing unit 54 captures (images) a tomographic image that is an image of a cross section of the eye of the patient under the control of the image processing apparatus 13, and supplies the obtained tomographic image to the image processing apparatus 13. Here, the tomographic image is an image of a cross section in a direction substantially parallel to the eye axis direction in the eye of the patient.

Note that, for example, the tomographic image capturing unit 54 acquires a tomographic image by the interference principle using infrared light, but an optical path of the infrared light at that time and a part of an optical path of the observation light in the observation optical system 52 may be a common optical path.

The eyepiece lens 12 condenses the observation light incident from the observation optical system 52 through the presentation unit 55 to form an optical image of the eye of the patient. As a result, the optical image of the eye of the patient is observed by the operator who is looking through the eyepiece lens 12.

The presentation unit 55 includes a transmissive or non-transmissive display device or the like, and is disposed between the eyepiece lens 12 and the observation optical system 52. The presentation unit 55 transmits the observation light incident from the observation optical system 52 and causes the observation light to be incident on the eyepiece lens 12, and also presents (displays) various images (for example, a front image, a tomographic image, or the like) and various information supplied from the image processing apparatus 13 as necessary. For example, various images, various types of information, and the like may be superimposed and presented on the optical image of the eye of the patient, or may be presented in a peripheral portion of the optical image so as not to disturb the optical image. Furthermore, the transmissive display device and the non-transmissive display device are configured to be switchable, and are switched as necessary. For example, there are a transmission mode and a non-transmission mode, and these modes are changed by an operator or the like, and the transmissive display device and the non-transmissive display device are switched.

The image processing apparatus 13 includes the control unit 13A that controls an operation of the entire surgical microscope 10. For example, the control unit 13A changes an illumination condition of the light source 51 or changes a zoom magnification of the observation optical system 52. Furthermore, the control unit 13A controls image acquisition of the front image capturing unit 53 and the tomographic image capturing unit 54 on the basis of operation information or the like of the operator or the like supplied from the interface unit 56.

The interface unit 56 includes, for example, a communication unit or the like. The communication unit receives a command from an operation unit such as a touch panel superimposed on the monitor 14, a foot switch, a controller, or a remote controller, or communicates with an external device. The interface unit 56 supplies information or the like corresponding to the operation of the operator or the like to the image processing apparatus 13. Furthermore, the interface unit 56 outputs device control information or the like for controlling an external device supplied from the image processing apparatus 13 to the external device.

The monitor 14 displays various images such as a front image and various types of information on a display screen in response to the control of the control unit 13A of the image processing apparatus 13.

In response to the control by the control unit 13A of the image processing apparatus 13, for example, in a case where a dangerous situation is detected during surgery, the speaker 57 outputs a sound such as a buzzer sound or a melody sound, a message (voice), or the like in order to notify the operator or the like of the dangerous situation. Note that the surgical microscope 10 may include a rotating lamp or an indicator lamp for notifying the operator and the like of the dangerous situation.

In the surgical microscope system 1 having the above configuration, by using the display screen that presents one or both of a specific position and a specific size (a specific position and a specific size with respect to the eye) based on a preoperative plan due to boundaries of the plurality of regions having different display modes, occlusion does not occur, the operator can easily see the operative field image, and the above-described specific position or specific size can also be grasped, so that the ophthalmic surgery according to the preoperative plan can be performed with high accuracy. The difference in the display modes is a difference in parameters or the like related to a display condition, and is, for example, a difference in luminance, a difference in saturation, a difference in color temperature, a difference in color, a difference in contrast, a difference in sharpness, or the like.

<1-3. Schematic Configuration of Image Processing Apparatus and Example of Image Processing>

Figure 3:
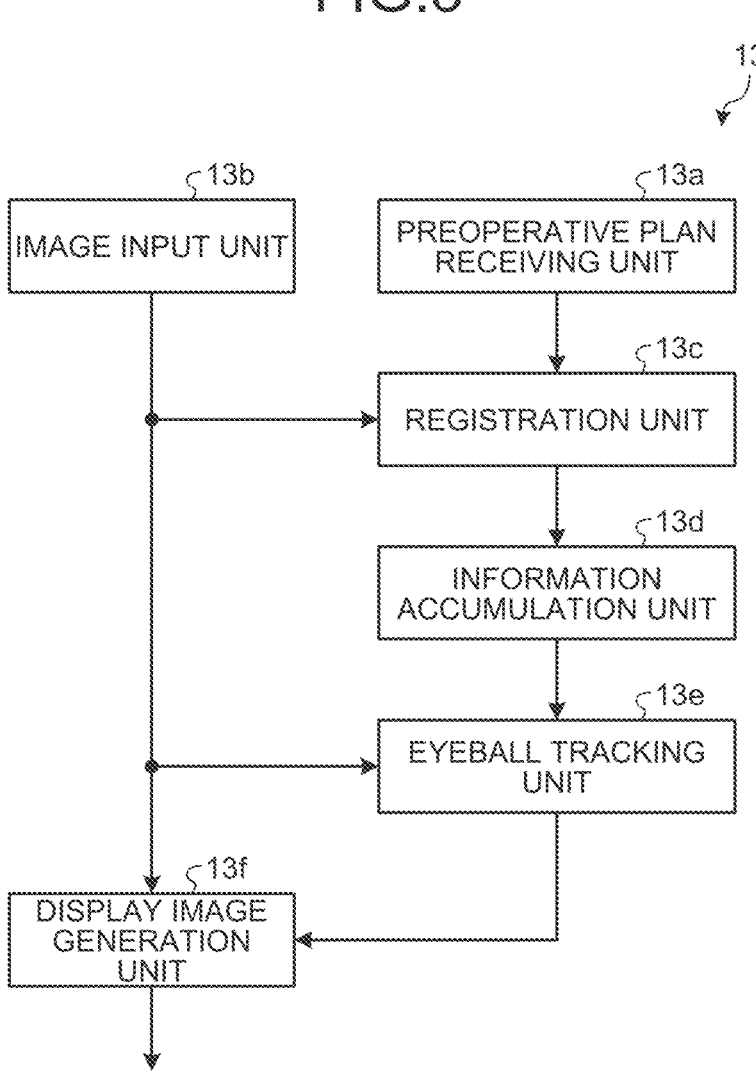
FIG. 3 is a diagram illustrating an example of a schematic configuration of an image processing apparatus according to the embodiment of the present disclosure.

An example of a schematic configuration and image processing of the image processing apparatus 13 according to the embodiment will be described with reference to FIG. 3. FIG. 3 is a diagram illustrating an example of a schematic configuration (configuration and processing flow) of the image processing apparatus 13 according to the embodiment.

As illustrated in FIG. 3, the image processing apparatus 13 includes a preoperative plan receiving unit 13a, an image input unit 13b, a registration unit 13c, an information accumulation unit 13d, an eyeball tracking unit 13e, and a display image generation unit 13f.

The preoperative plan receiving unit 13a receives preoperative plan information (for example, preoperative image, posture information, and the like of the preoperative plan) for the eye of the patient. The posture information of the preoperative plan includes information (size information, position information, orientation information, and the like) regarding a size of an index (index related to the operation) based on a site such as a corneal limbus in the preoperative image, a position of the index, and a direction of the index around an eye axis (a position of a rotation direction around the eye axis). For example, the size of the index, the position of the index, the direction of the index around the eye axis, and the like include a position, a shape, a size, and the like of an incision, and a position and a direction of an implant such as an intraocular lens to be inserted. Note that the direction around the eye axis is defined by an angle in the rotation direction around the eye axis with respect to a reference line orthogonal to the eye axis. However, both the position of the coordinate system of the index and the position of the rotation direction around the eye axis correspond to the position information of the index (position information of the specific position).

The image input unit 13b receives the operative field image (front image) from the front image capturing unit 53 (see FIG. 2), and supplies the received operative field image (for example, an operative field image at the start of surgery, a real time operative field image during surgery, and the like) to the registration unit 13c, the eyeball tracking unit 13e, the display image generation unit 13f, and the like.

The registration unit 13c compares the preoperative image of the preoperative plan with the operative field image at the start of surgery to obtain a correspondence relationship between the preoperative image of the preoperative plan and the operative field image at the start of surgery, for example, a transformation parameter (as an example, a transformation parameter of coordinate transformation) from the preoperative image to the operative field image at the start of surgery. Then, the registration unit 13c supplies the obtained relationship information regarding the transformation parameter to the information accumulation unit 13d together with the operative field image at the start of surgery.

The information accumulation unit 13d transforms (changes) the posture information of the preoperative plan in accordance with the operative field image at the start of surgery on the basis of the relationship information and the operative field image at the start of surgery supplied from the registration unit 13c, and accumulates the operative field image at the start of surgery and the posture information of the preoperative plan transformed in accordance with the operative field image at the start of surgery.

The eyeball tracking unit 13e tracks the eyeball in the real time operative field image by comparing the operative field image at the start of surgery with the real time operative field image. Furthermore, the eyeball tracking unit 13e supplies relationship information (for example, a transformation parameter or the like) indicating a relationship between the posture information of the eyeball in the real time operative field image and the posture information of the preoperative plan accumulated by the information accumulation unit 13d to the display image generation unit 13f as a tracking result. Similarly to the posture information of the preoperative plan, the posture information of the eyeball includes information (size information, position information, orientation information, and the like) regarding a size of the eyeball, a position of the eyeball, and a direction of the eyeball around the eye axis (a position in the rotation direction around the eye axis). However, both the position in the coordinate system of the eyeball and the position in the rotation direction around the eye axis correspond to the position information of the eyeball.

The display image generation unit 13f sets a plurality of regions having different display modes for the real time operative field image by processing the real time operative field image, and generates a display image in which a boundary of each region indicates a specific position or a specific size with respect to the eye of the patient. At this time, the display image generation unit 13f processes the real time operative field image, that is, each region such that the boundary of each region indicates the specific position or the specific size on the basis of the transformed posture information of the preoperative plan. Furthermore, the display image generation unit 13f processes the real time operative field image so as to change the posture (position, direction, size, and the like) of the boundary of each region on the basis of the tracking result of the eyeball of the real time operative field image, and generates the display image. At this time, the display image generation unit 13f processes the position and the size of the boundary in the real time operative field image on the basis of the relationship information supplied from the eyeball tracking unit 13e so that the relationship between the position and the size of the boundary with respect to the eyeball in the operative field image at the start of surgery does not change, and generates the display image.

Example 1 of Display Image

Figure 4:
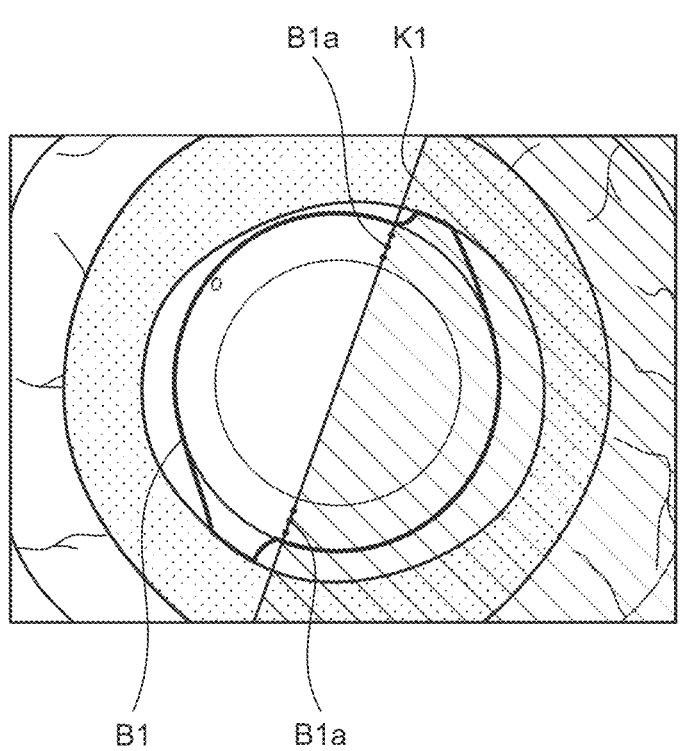
FIG. 4 is a diagram illustrating Example 1 of a display image according to the embodiment of the present disclosure.

Example 1 of the display image according to the embodiment will be described. FIG. 4 is a diagram illustrating Example 1 of the display image according to the embodiment.

As illustrated in FIG. 4, in the display image, a boundary K1 between two regions (left and right regions) having different display modes is presented. The boundary K1 indicates a specific position based on the preoperative plan, another plan, or the like, that is, a specific position regarding the operation. The boundary K1 is transformed (changed) to move by the above-described movement amount in a movement direction of the eyeball such that the posture change of the boundary K1 with respect to the eyeball is eliminated according to the movement direction and the movement amount of the eyeball. The display image having such a boundary K1 is displayed on the display screen by both or one of the monitor 14 and the presentation unit 55. Note that, in a case where the presentation unit 55 displays the display image having the boundary K1, the transmissive display device is switched to the non-transmissive display device, and the non-transmissive display device is used.

In the example of FIG. 4, the boundary K1 is a boundary of a line shape, and is a boundary passing through a center position where an intraocular lens B1 such as a toric IOL for performing astigmatism correction is desired to be placed. The boundary K1 indicates a boundary line for alignment of the intraocular lens B1 (target position for installation of the intraocular lens B1). Two marks B1*a* (as an example, three points arranged in a straight line) of the intraocular lens B1 are aligned with the boundary K1. For example, in a case where the intraocular lens B1 is a toric IOL, it is necessary to make a toric axis of the intraocular lens B1 coincide with an astigmatism axis of the patient, and a sufficient astigmatism correction effect cannot be obtained in a case where a deviation occurs in a direction around the eye axis (a position in the rotation direction around the eye axis). Therefore, the two marks B1*a* indicating the toric axis are imprinted on an end point of the toric IOL, and the direction of the toric IOL around the eye axis can be grasped. At the time of surgery, the marks B1*a* of the toric IOL are aligned with the boundary K1 in the real time operative field image, and the toric IOL is placed in the eye.

Here, in many ophthalmic surgery guidance systems, the preoperative image and the image at the start of surgery (operative field image at the start of surgery) are registered, and then a mark based on the preoperative plan is mapped and displayed on the real time image by comparison (tracking) between the image at the start of surgery and the real time image (real time operative field image). However, in this method, since the mark based on the preoperative plan is superimposed on the operative field image, occlusion (shielding) in which a part of the operative field image is invisible by the mark occurs.

For this reason, it becomes difficult for the operator to see the operative field image, and it becomes difficult to perform axial alignment of the toric IOL (intraocular lens for astigmatism correction), centering of the IOL, wound creation, anterior capsule incision, and the like. Therefore, it is difficult to accurately perform the surgery according to the preoperative plan. Therefore, by presenting the specific position or the specific size regarding the operation not by the mark but by the boundary (for example, the boundary K1) of each region having different display modes, it is possible to prevent the occurrence of occlusion and to accurately perform the surgery according to the preoperative plan.

(Specific Processing Flow)

Figure 5:
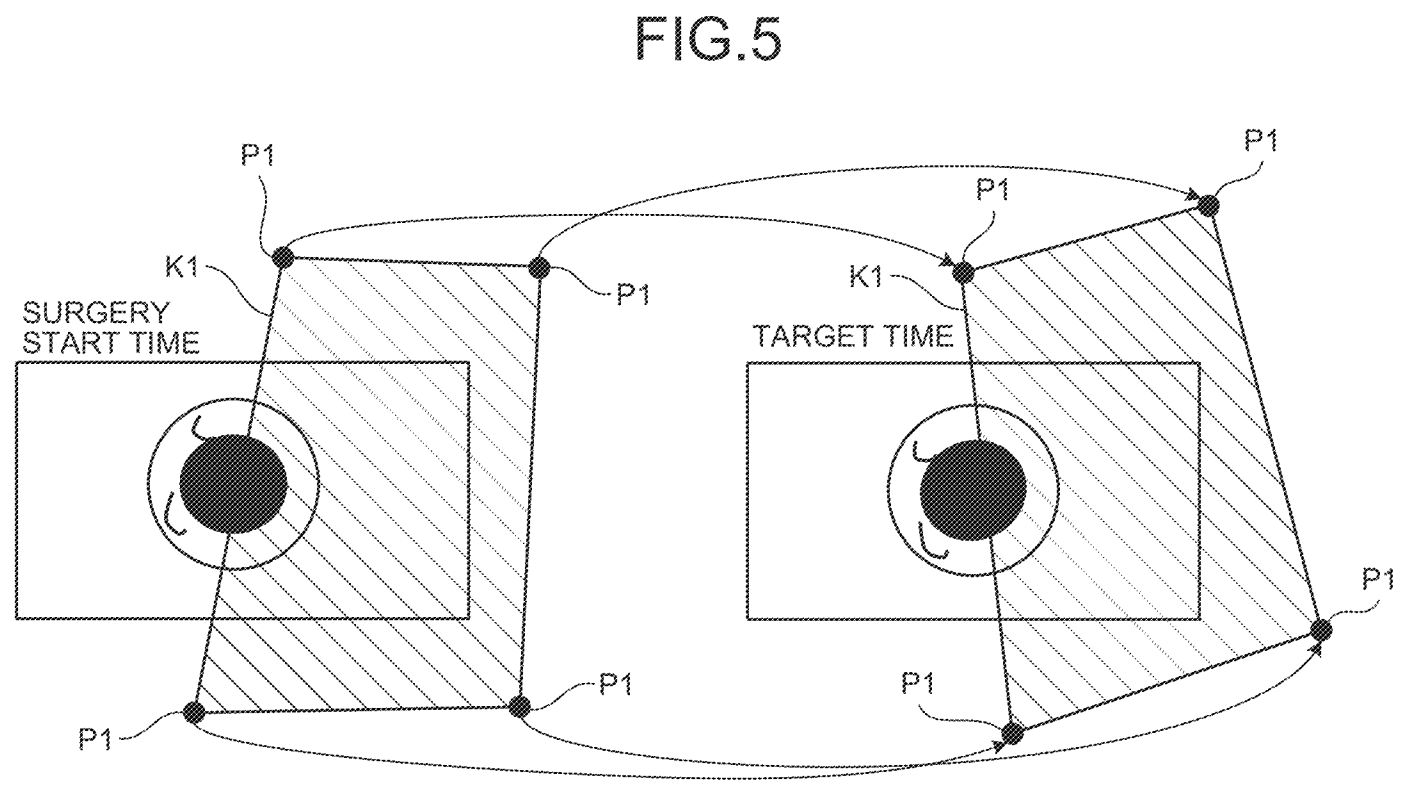
Figure 6:
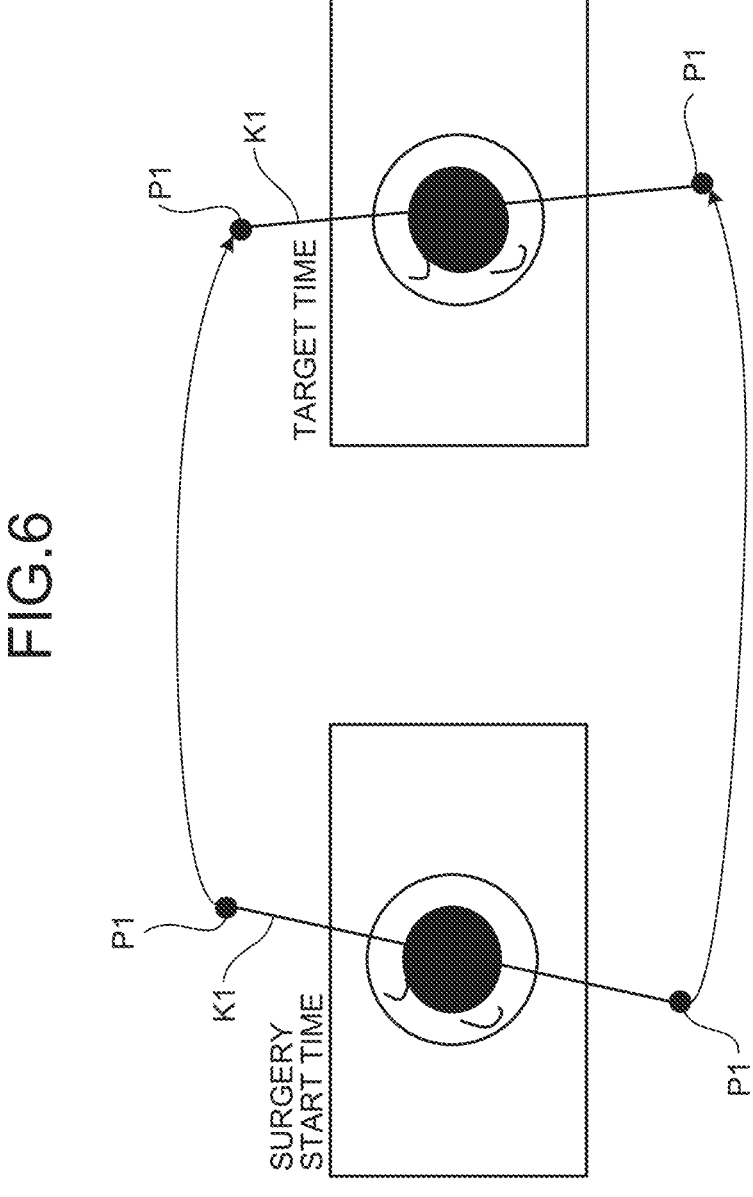
FIG. 6 is a second diagram for explaining display image generation according to the embodiment of the present disclosure.

Specific processing is performed along the following flow. Registration, tracking, image generation, and image presentation are sequentially performed. FIGS. 5 and 6 are diagrams for explaining display image generation (transformation processing) according to the embodiment.

In the registration, preoperative plan information including a preoperative image (for example, an eyeball image or the like) and an image at the start of surgery (operative field image at the start of surgery) are received, and the direction and the position of the eyeball at the time of making a preoperative plan are matched with a reference of the direction and the position of the eyeball during surgery. As an alignment method, for example, alignment may be automatically performed by image processing using the preoperative image and the image at the start of surgery, or alignment may be performed by a user manually adjusting the position and the direction (for example, a rotation angle or the like). When the registration is successful, surgery plan information based on the coordinates of the image at the start of surgery is held.

In the tracking, the movement of the eyeball from the start of surgery is tracked, and a transformation parameter (coordinate transformation parameter) from the image at the start of surgery to the coordinates at the tracking time is obtained. As a tracking method, for example, a feature point may be extracted from both images of the preoperative image and the image at the start of surgery, and a transformation parameter may be obtained from the correspondence relationship, or a feature point may be extracted from one image, and a motion of the feature point may be searched for, and then a transformation parameter may be obtained, or an image may be input to machine learning, and a transformation parameter may be obtained on a learning basis.

In the image generation, on the basis of the transformation parameter extracted in the tracking, control point coordinates P1 of a region (for example, a modulation region or the like) where the boundary K1 indicating the specific position is generated are transformed from the surgery plan information obtained by the registration as illustrated in FIG. 5, or the control point coordinates P1 of a boundary line indicating the boundary K1 are transformed as illustrated in FIG. 6. Thereafter, when a transformation target is the control point coordinates P1 of the region, the image processing is performed on the region, and when the transformation target is the control point coordinates P1 of the boundary line, the image processing is performed on the region based on the boundary line to generate the display image. This display image includes a plurality of regions having different display modes.

In the example of FIG. 5, the control point coordinates P1 indicating the region are four points, but the control point coordinates P1 may be three or more points. A region surrounded by these control point coordinates P1 is a processing target. Furthermore, in the example of FIG. 6, the control point coordinates P1 indicating the boundary line are two points, but the control point coordinates P1 may be two or more points. In a case where the boundary has a complicated shape, a plurality of control point coordinates, that is, a plurality of control points may be added. When the boundary line is determined, one of the left and right regions (or one of the upper and lower regions) of the boundary line is to be processed. Note that the control point coordinates P1 indicating the region or the boundary may be connected by a straight line, may be smoothly connected by spline inter-polation or the like, or may be connected by a specific shape such as a semicircle passing through two points. Further-more, the number of regions to be processed is not limited to one, and may be plural.

In the image presentation, a display image generated by the image generation processing is presented as an operative field video. The display image (see FIG. 4) having the boundary K1 is displayed on the display screen by both or one of the monitor 14 and the presentation unit 55.

Here, as the coordinate transformation, for example, an affine transformation, a homography transformation, or the like can be used. Furthermore, as the image processing, the image processing is realized by adjusting parameters such as luminance (brightness), contrast (shading), saturation, color temperature, sharpness, gray scaling, and changing a spe-cific color to another specific color, that is, by changing a pixel value of the image. Specifically, for example, process-ing based on a calculation formula (for example, non-linear calculation such as gain adjustment, offset processing, and γ processing, and the like), processing by a lookup table (for example, change from a specific color to a specific color, conversion from a specific luminance value to a specific luminance value in order to change contrast, and the like), processing by a spatial filter, or the like can be used alone or in combination. At this time, the display image generation unit 13*f* may automatically select and execute processing for making a boundary conspicuous with respect to the original operative field image (original image). Note that as an example of conversion from a specific luminance value to a specific luminance value, there is a change of an S-shaped curve of contrast.

In the image processing, regarding the luminance, for example, a specific channel is changed. Furthermore, regarding the contrast, for example, a gain corresponding to a value of a specific channel is added. Regarding the saturation, for example, a uniform gain is added to a specific channel. Regarding the color temperature, a uniform gain different for each channel is added. Regarding the gray scaling, for example, a specific channel value is changed. Regarding the color change, for example, conversion is performed according to the pixel value.

Note that the image has color information in the form of a channel, for example. An RGB image has three channels of red (Red), green (Green), and blue (Blue). Furthermore, an HSL image includes three channels of hue (Hue), satu-ration (Saturation), and luminance (Lightness/Luminance or Intensity). Furthermore, a CMYK image includes four chan-nels of cyan, magenta, yellow, and black.

Furthermore, in image generation, an information pattern to be presented and a processing method may be changed on the basis of an instruction of a user such as an operator. Examples of the information pattern to be presented include various information patterns (various display patterns) cor-responding to wound creation, anterior capsule incision, axial alignment of toric IOL (intraocular lens for astigma-tism correction), centering of IOL, and the like. For example, the user can select an information pattern to be presented or a processing method by operating the operation unit.

Furthermore, since the tracking takes a processing time, if the operative field image is created after the tracking infor-mation is generated, a delay between the image and the reality increases. Therefore, the delay of the image genera-tion may be suppressed by closing the eyes when the tracking information is delayed and using the latest calcu-lated past tracking information in the image generation.

Examples 2 to 6 of Display Image

Examples 2 to 6 of the display image according to the embodiment will be described with reference to FIGS. 7 to 11. FIGS. 7 to 11 are diagrams illustrating Examples 2 to 6 of the display image according to the embodiment. In Examples 2 to 6, variations of the display image will be described.

Figure 7:
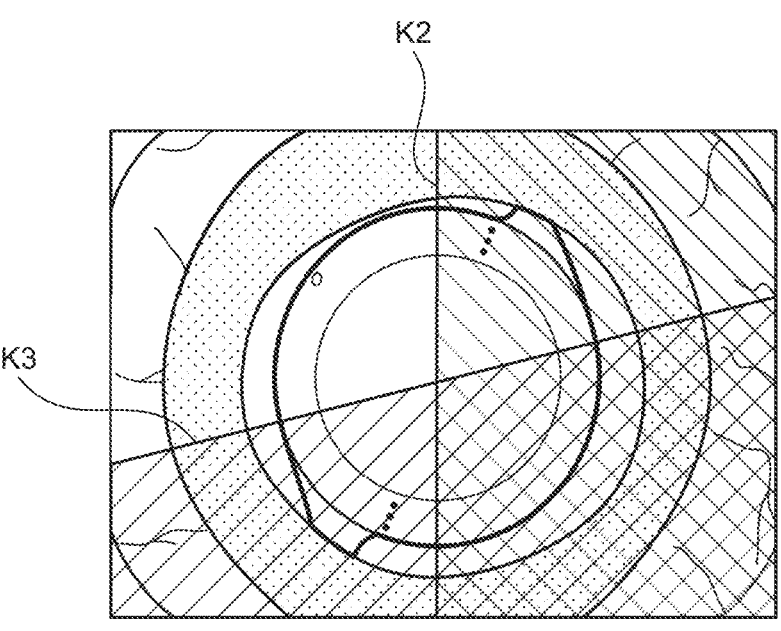
FIG. 7 is a diagram illustrating Example 2 of a display image according to the embodiment of the present disclosure.

As illustrated in FIG. 7, two boundaries K2 and K3 indicating a center position in the display image are pre-sented. In the example of FIG. 7, an intersection of the boundaries K2 and K3 indicates, for example, the center position (for example, an eye axis position and the like) for IOL installation. Furthermore, in the example of FIG. 7, a right side region of the boundary K2 in an operative field image is processed, and a lower side region of the boundary K3 is processed.

Figure 8:
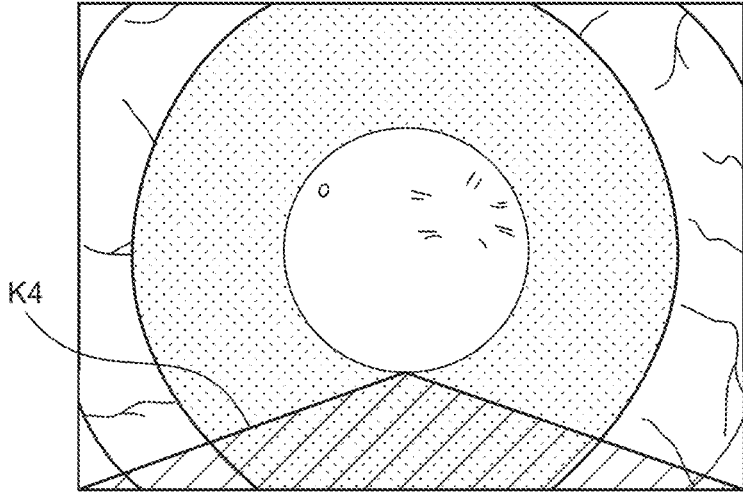
FIG. 8 is a diagram illustrating Example 3 of a display image according to the embodiment of the present disclosure.

As illustrated in FIG. 8, a boundary K4 indicating an incision position is presented in a display image. In the example of FIG. 8, the boundary K4 is two sides of the triangle, and the vertex of the triangle indicates the incision position (for example, the incision start position and the like). Furthermore, in the example of FIG. 8, a lower region (triangular region) of the boundary K4 in an operative field image is processed.

Figure 9:
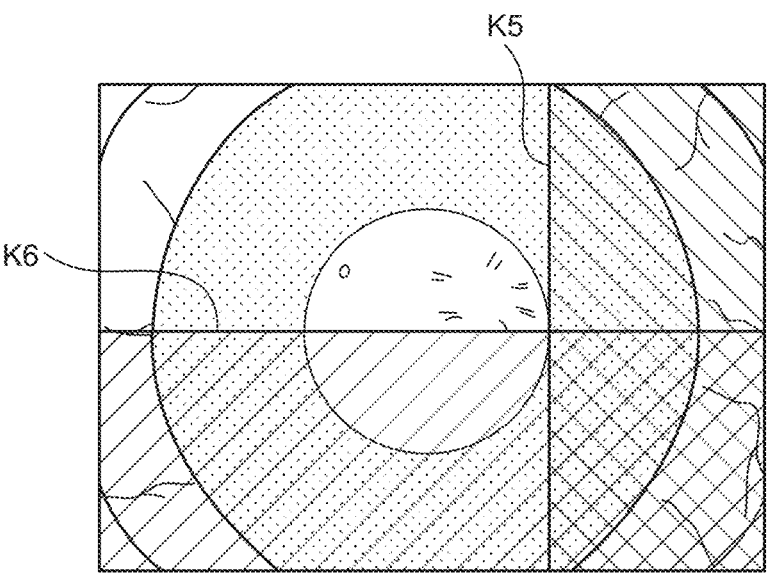
FIG. 9 is a diagram illustrating Example 4 of a display image according to the embodiment of the present disclosure.

As illustrated in FIG. 9, two boundaries K5 and K6 indicating an incision position are presented in a display image. In the example of FIG. 9, an intersection of the boundaries K5 and K6 indicates the incision position (for example, an incision start position and the like). Further-more, in the example of FIG. 9, a right side region of the boundary K5 in an operative field image is processed, and a lower side region of the boundary K6 is processed.

Figure 10:
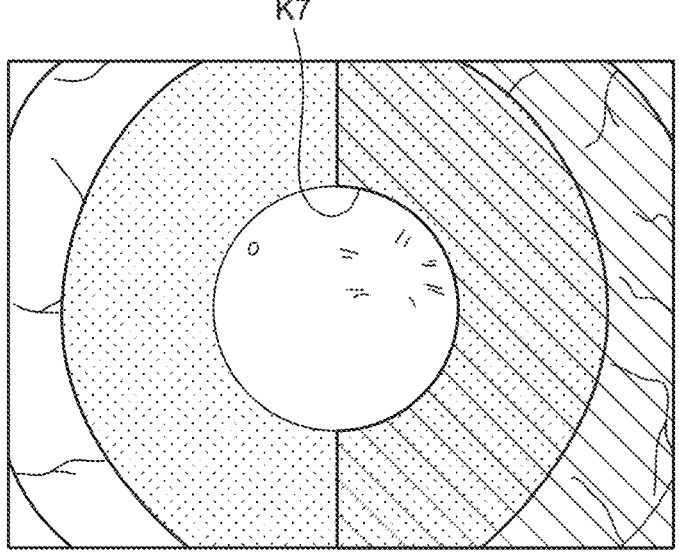
FIG. 10 is a diagram illustrating Example 5 of a display image according to the embodiment of the present disclosure.

As illustrated in FIG. 10, a boundary K7 indicating an incision size and an incision position is presented in a display image. In the example of FIG. 10, the boundary K7 indicates the incision size and the incision position (for example, a continuous incision position or the like) for CCC (anterior capsule incision), for example. This boundary K7 functions, for example, as a boundary of a shape having a semicircle, that is, a semi-circle boundary (semicircle for forming a target circle for anterior capsulotomy). Further-more, in the example of FIG. 10, a right region of the boundary K7 in an operative field image is processed. Note that, as a center of the annular shape such as the target circle described above, a corneal limbus center, a pupil center, a preoperative pupil center, a visual axis, an anterior capsule incision edge center, and the like can be used in addition to the eye axis.

Figure 11:
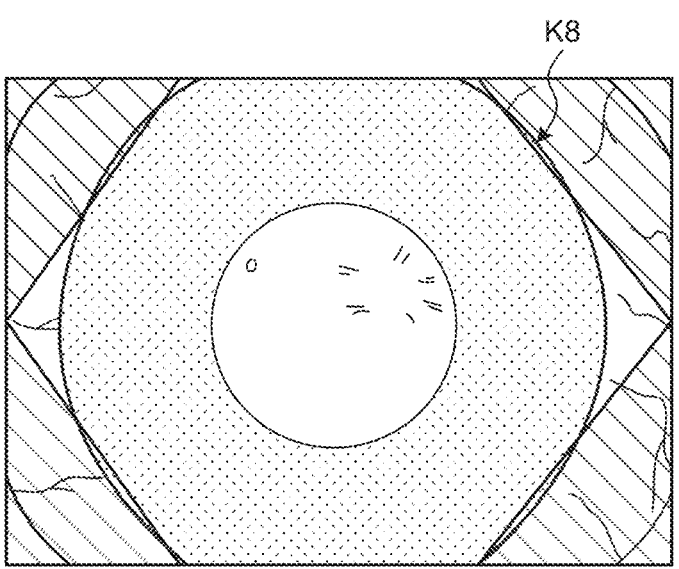
FIG. 11 is a diagram illustrating Example 6 of a display image according to the embodiment of the present disclosure.

As illustrated in FIG. 11, a boundary K8 indicating a specific region, that is, a region size and a region position of the specific region is presented in a display image. In the example of FIG. 11, the boundary K8 is hexagonal six sides (or four sides), and indicates the region size and the region position of the specific region. The boundary K8 indicates to the operator that the eyeball (eye) is brought to a center of an operative field image in a case where the eyeball is lost in tracking, for example. Furthermore, in the example of FIG. 11, an outer region of the boundary K8 in the operative field image is processed.

Examples 7 to 9 of Display Image

Figure 12:
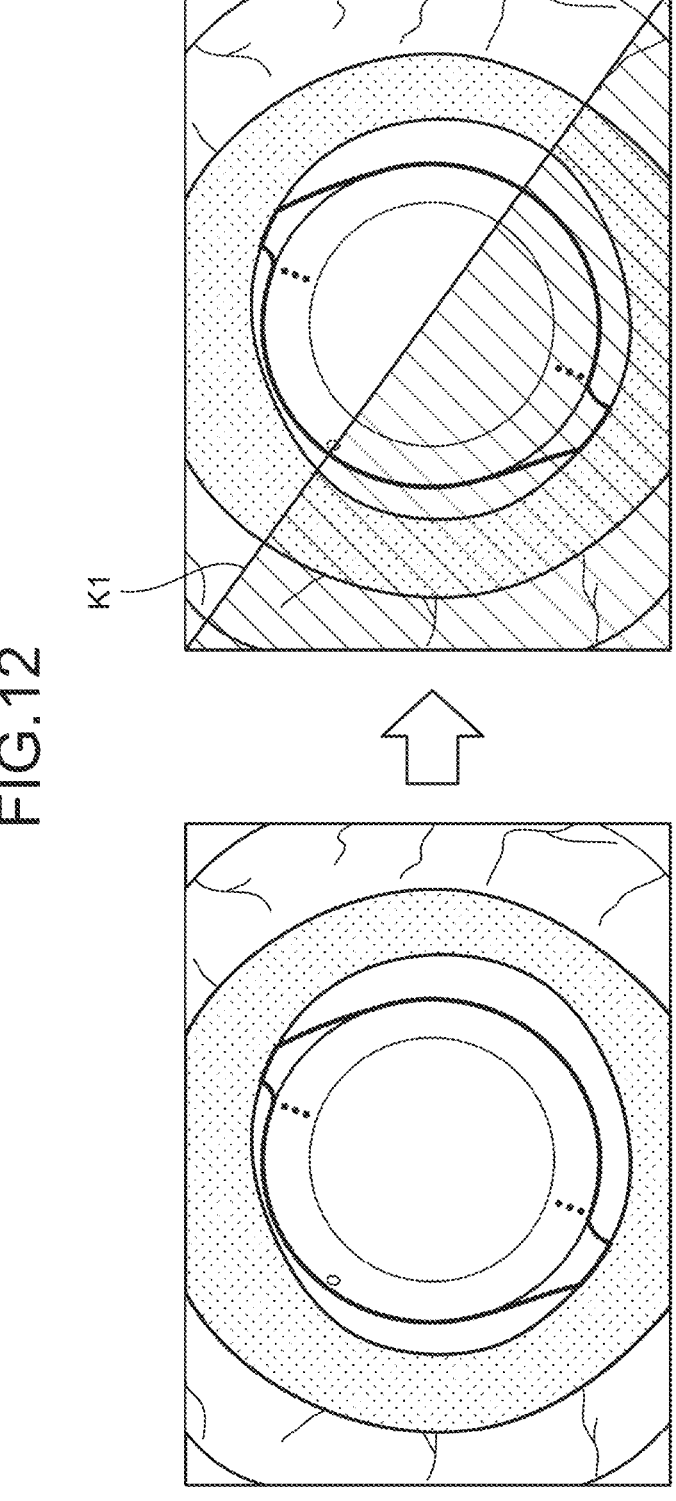
FIG. 12 is a diagram illustrating Example 7 of a display image according to the embodiment of the present disclosure.
Figure 13:
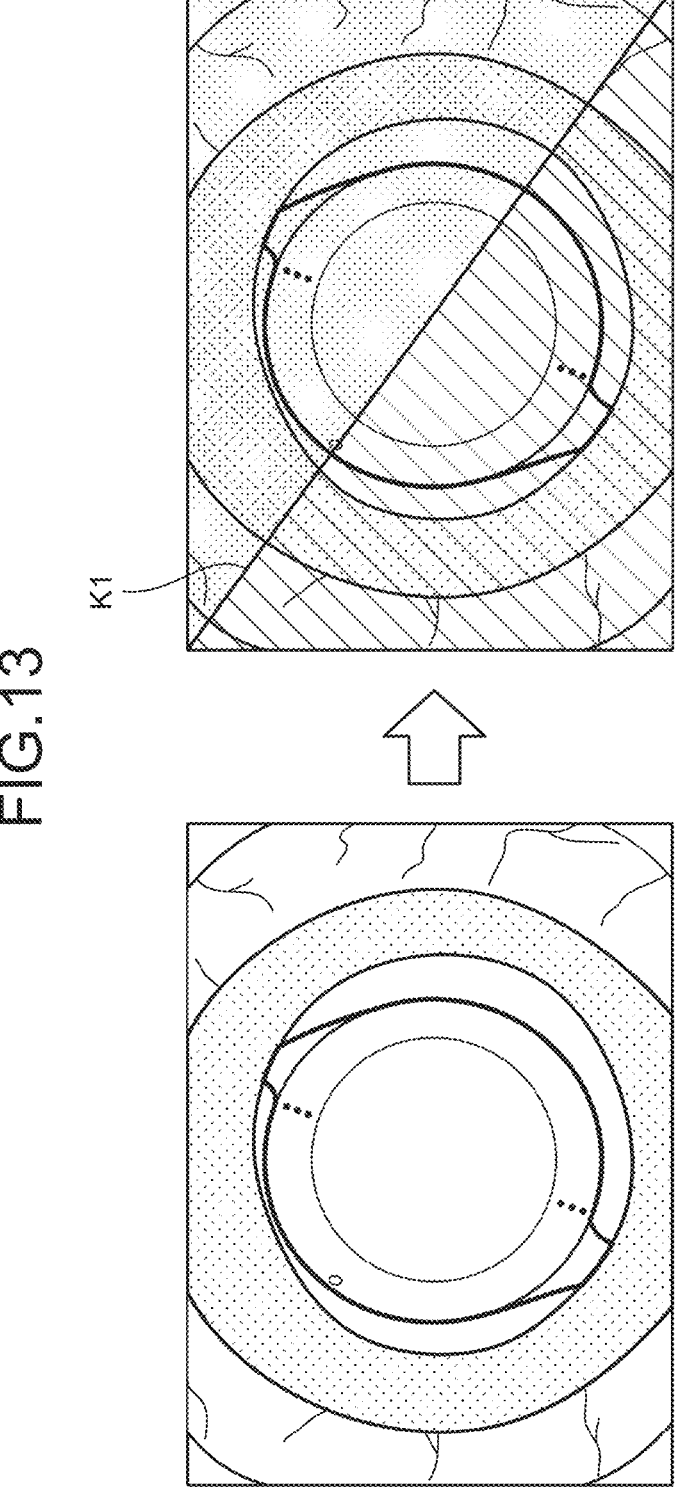
FIG. 13 is a diagram illustrating Example 8 of a display image according to the embodiment of the present disclosure.
Figure 14:
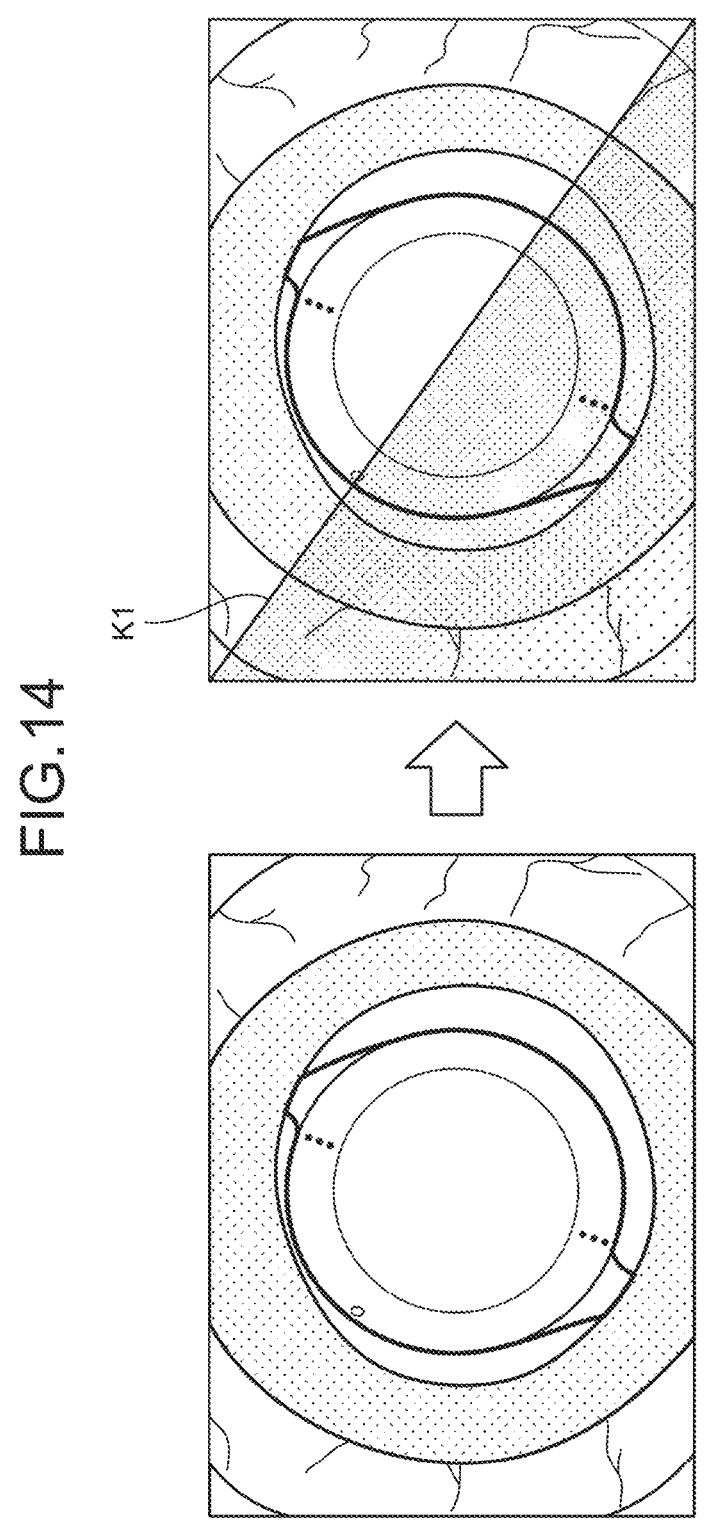

Examples 7 to 9 of the display image according to the embodiment will be described with reference to FIGS. 12 to 14. FIGS. 12 to 14 are diagrams illustrating Examples 7 to 9 of the display image according to the embodiment. In Examples 8 and 9, an additional point for reducing a difference between an image before processing and an image after processing while maintaining the clarity of the boundary K1 will be described.

As illustrated in FIG. 12, a region to which the image processing is applied may be a region on one side of the boundary K1. In a case where the region to which the image processing is applied is a region on one side of the boundary K1, a change amount of the region on one side to which the image processing is applied is large, and a region on one side to which the image processing is not applied remains. That is, in the case of processing the region on one side, since the modulation is performed at a level at which the boundary K1 can be seen, there is an advantage that while a difference from the original image increases in the region on the processed side, there is also a region that is not processed.

As illustrated in FIG. 13, a region to which the image processing is applied may be regions on both sides of the boundary K1. In the example of FIG. 13, a region on one side (an upper region of the boundary K1) is brighter by 10% than the original image (an operative field image before processing), and a region on the other side (a lower region of the boundary K1) is darker by 10% than the original image. By applying different processing to the regions on both sides in this manner, it is possible to reduce an amount of change from the original image while maintaining the clarity of a boundary gap. That is, in the case of processing the regions on both sides, while there is no unprocessed region, since the same boundary gap is realized by the processing for the regions on both sides, there is an advantage that a difference between the original image and the processed operative field image can be kept within a small range.

As illustrated in FIG. 14, when there is a difference between the regions on both sides of the boundary K1 (difference in display mode), information can be transmitted. Therefore, an intensity of processing (for example, an intensity of modulation) for the region may be weakened as a distance from the boundary K1 increases. In the example of FIG. 14, in a left region of the boundary K1, the intensity of processing on the region is weakened as the distance from the boundary K1 increases. For example, in a case where the processing for the region is processing for increasing luminance, when the intensity of the processing for increasing the luminance for the region is weakened as the distance from the boundary K1 increases, the luminance of the region is weakened as the distance from the boundary K1 increases. As described above, by weakening the intensity of the processing on the region as the distance from the boundary K1 increases, a difference between the original image and the processed operative field image can be weakened in a portion away from the boundary K1. That is, the clarity of a gap of the boundary K1 can be maintained, and a region away from the boundary K1 can be brought close to the original image.

Examples 10 and 11 of Display Images

Figure 15:
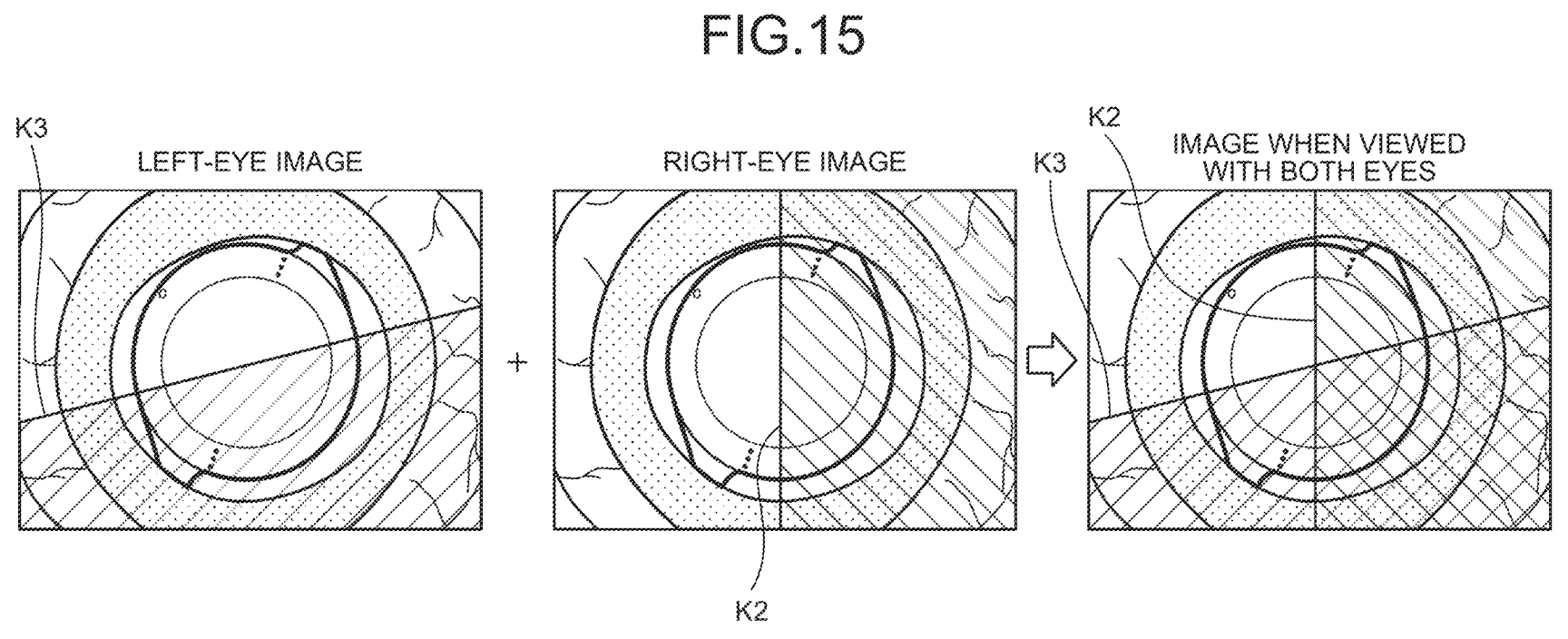
Figure 16:
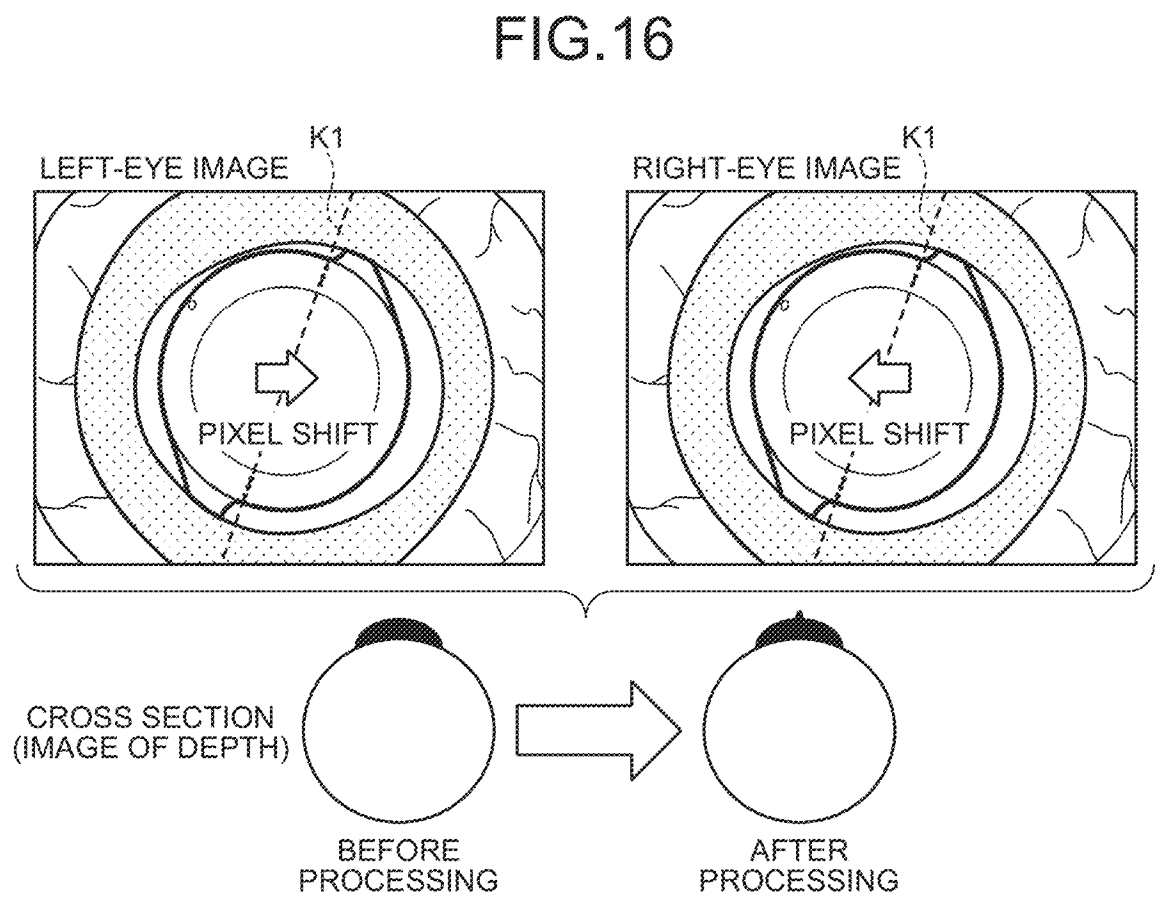

Examples 10 and 11 of the display image according to the embodiment will be described with reference to FIGS. 15 and 16. FIGS. 15 and 16 are diagrams illustrating Examples 10 and 11 of the display image according to the embodiment. In Examples 10 and 11, additional points in 3D image (three-dimensional operative field image) presentation will be described. Normally, a 3D image is often used in ophthalmic surgery. In this case, a stereoscopic left-eye image and a stereoscopic right-eye image exist so that a sense of depth can be presented as a difference in parallax. Therefore, additional points for boundary presentation for the stereoscopic left-eye image and the stereoscopic right-eye image will be described. Note that, hereinafter, "for stereoscopic left eye" is simply described as "for left eye", and "for stereoscopic right eye" is simply described as "for right eye".

As illustrated in FIG. 15, regarding the boundary presentation for the 3D image, there are a case where the boundary is presented in both the left-eye image and the right-eye image, that is, a boundary K2 is presented in the right-eye image and a boundary K3 is presented in the left-eye image, and a case where the boundaries K2 and K3 are presented in only one of the left-eye image and the right-eye image (see FIG. 7). Note that, even if the boundaries K2 and K3 are presented only in the image for one eye, since an image change from the original image is small, there is an advantage that the 3D perception is not substantially affected and the operator can visually recognize the boundaries K2 and K3. Therefore, the boundaries K2 and K3 may be presented only in the image for one eye, or different boundaries (for example, the boundary K2 and the boundary K3) may be presented in the image for left eye and the image for right eye.

In the example of FIG. 15, different boundaries K2 and K3 are presented in the left-eye image and the right-eye image (the boundary K2 is presented in the right-eye image, and the boundary K3 is presented in the left-eye image.), and intersections of the boundaries K2 and K3 are presented by fusing the boundaries K2 and K3 in the brain. In this way, for example, in order to present a centering position and a wound position, the two boundaries K2 and K3 can be indicated by a crossed position or the like. Furthermore, it is possible to increase information that can be presented by a combination of various boundaries (for example, the boundary K2 and the boundary K3).

Note that, in a case where different boundaries K2 and K3 are presented in the left-eye image and the right-eye image, the different boundaries K2 and K3 may be presented in the left-eye image and the right-eye image on the basis of the information tracked in the one-eye image, and the different boundaries K2 and K3 may be presented in the left-eye image and the right-eye image on the basis of the information tracked in the both-eye images which are the left-eye image and the right-eye image.

Furthermore, in addition to presenting the different boundaries K2 and K3 in both the left-eye image and the right-eye image, the same boundary (for example, a boundary K1) may be presented in both the left-eye image and the right-eye image. In a case where the same boundary is presented in the left-eye image and the right-eye image, depth perception occurs with respect to the boundary, and thus, at which position the boundary is localized may be controlled. For example, if the ophthalmic surgery is CCC (anterior capsule incision), the boundary is localized at a position of the anterior capsule.

As illustrated in FIG. 16, for a boundary K1, processing of creating a depth gap in a 3D image may be performed. In the example of FIG. 16, as the image processing, the pixels of the left-eye image are shifted to the right, and the pixels of the right-eye image are shifted to the left. After the processing (after parallax modulation), since the parallax changes, a fixed position in the depth changes. The operator feels that the boundary K1 protrudes forward. As a result, the operator can easily grasp the position of the boundary K1, so that the ophthalmic surgery can be accurately performed.

Note that, in a case where the intensity of image processing (for example, a degree of modulation and the like) is small, even if processing is applied only to the image of one eye or different processing is applied to individual images of both eyes, flicker does not occur and parallax does not occur, unlike mark superimposition or the like. Therefore, there is no conflict between the operative field and the depth. Furthermore, in a case where the same processing is applied to individual images of both eyes, it is possible to localize to a desired specific depth position by generating parallax, and it is also possible to localize to a position to be treated by the user according to a guide.

(Change in Boundary Presentation)

Figure 17:
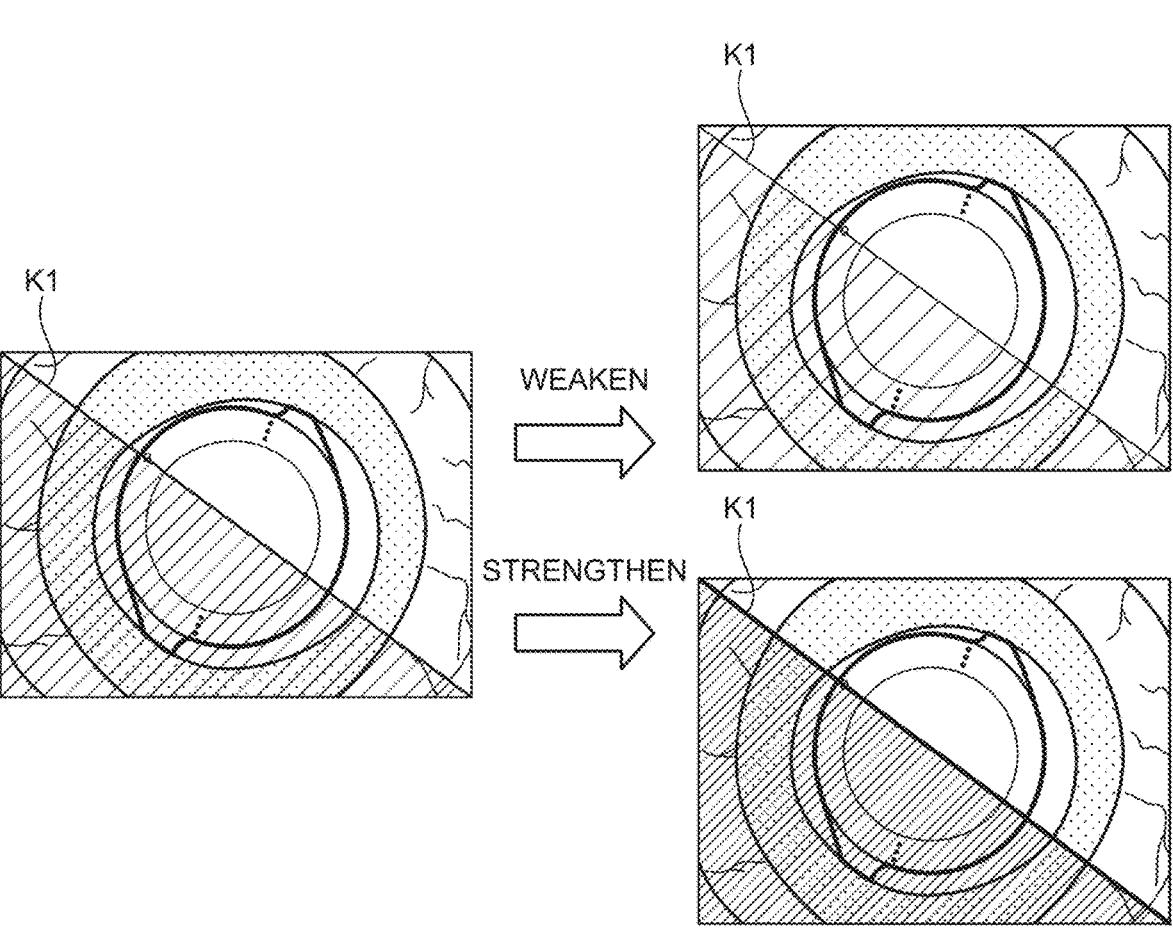
FIG. 17 is a diagram for explaining a change in boundary presentation according to a tracking situation according to the embodiment of the present disclosure.
Figure 18:
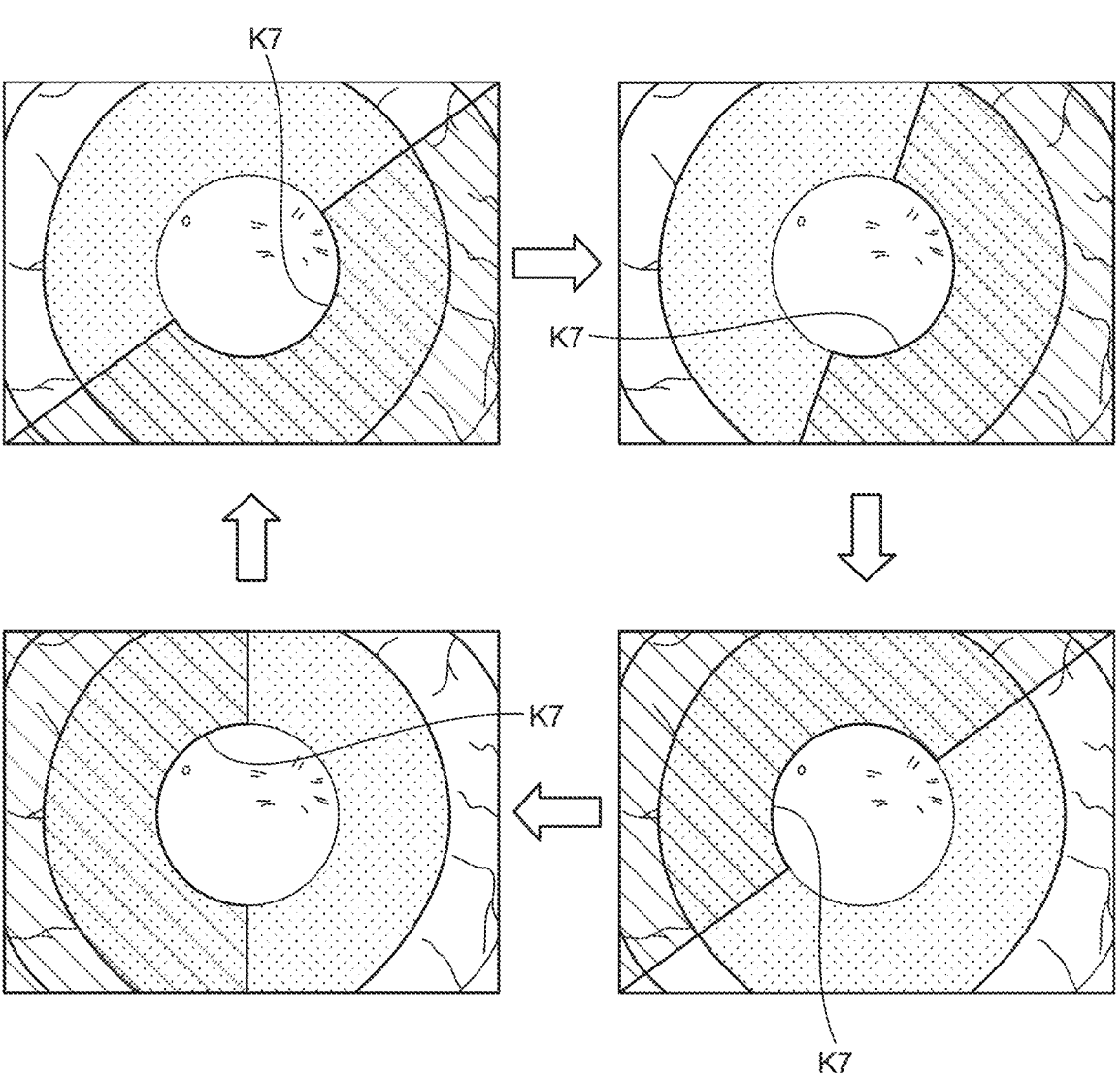
FIG. 18 is a first diagram for explaining a change in boundary presentation with time according to the embodiment of the present disclosure.
Figure 19:
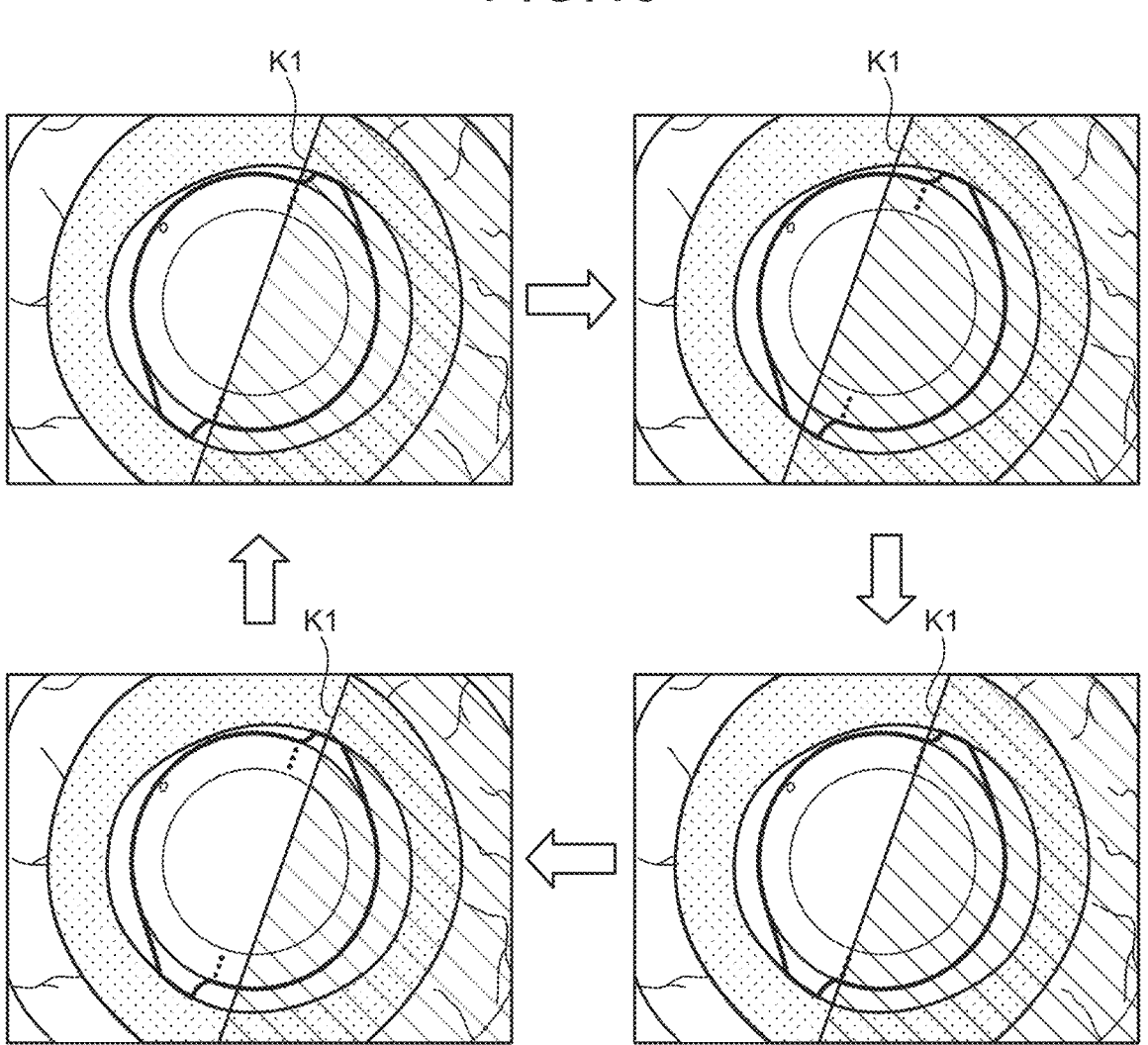
FIG. 19 is a second diagram for explaining a change in boundary presentation with time according to the embodiment of the present disclosure.
Figure 20:
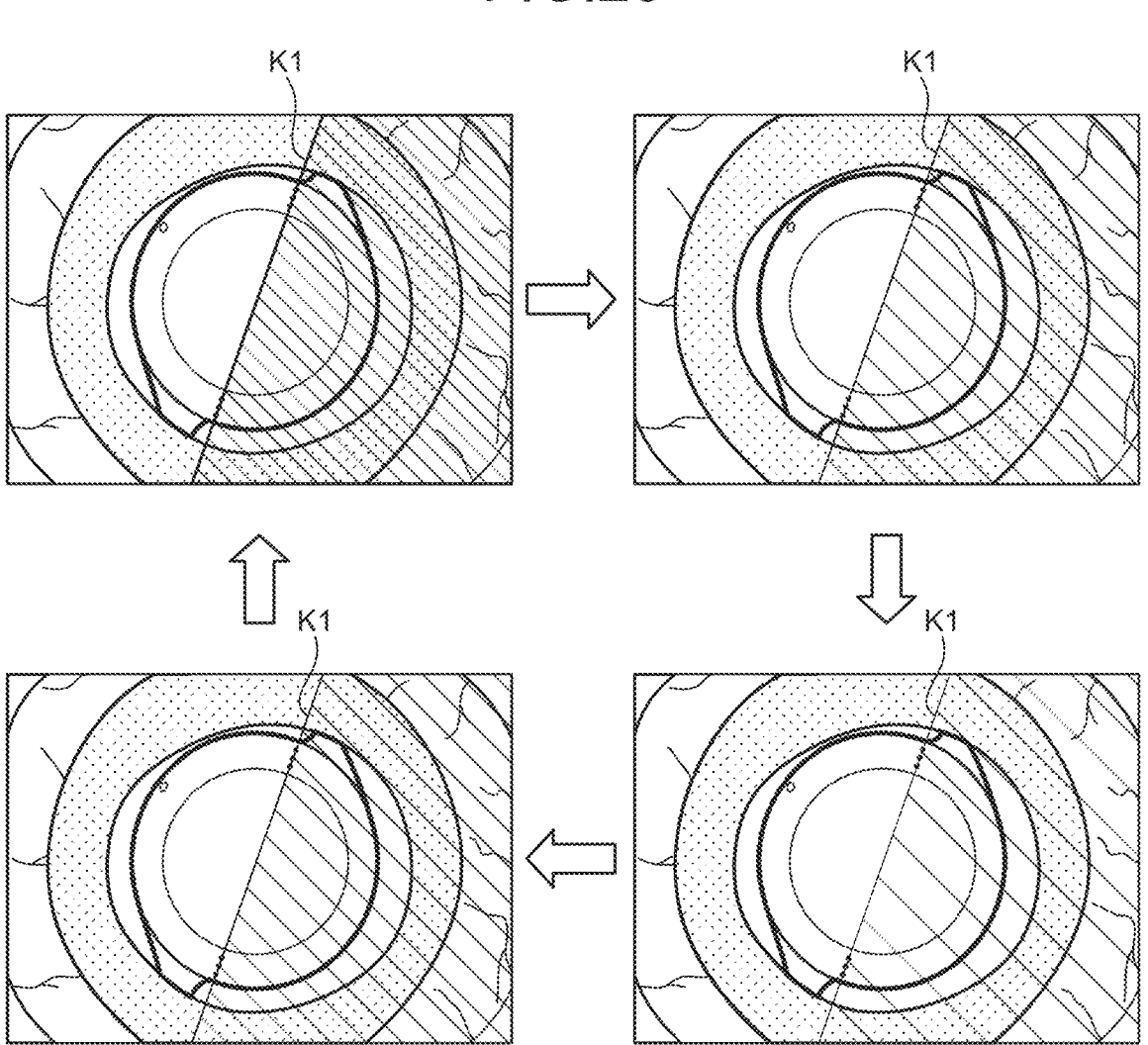
FIG. 20 is a third diagram for explaining a change in boundary presentation with time according to the embodiment of the present disclosure.
Figure 21:
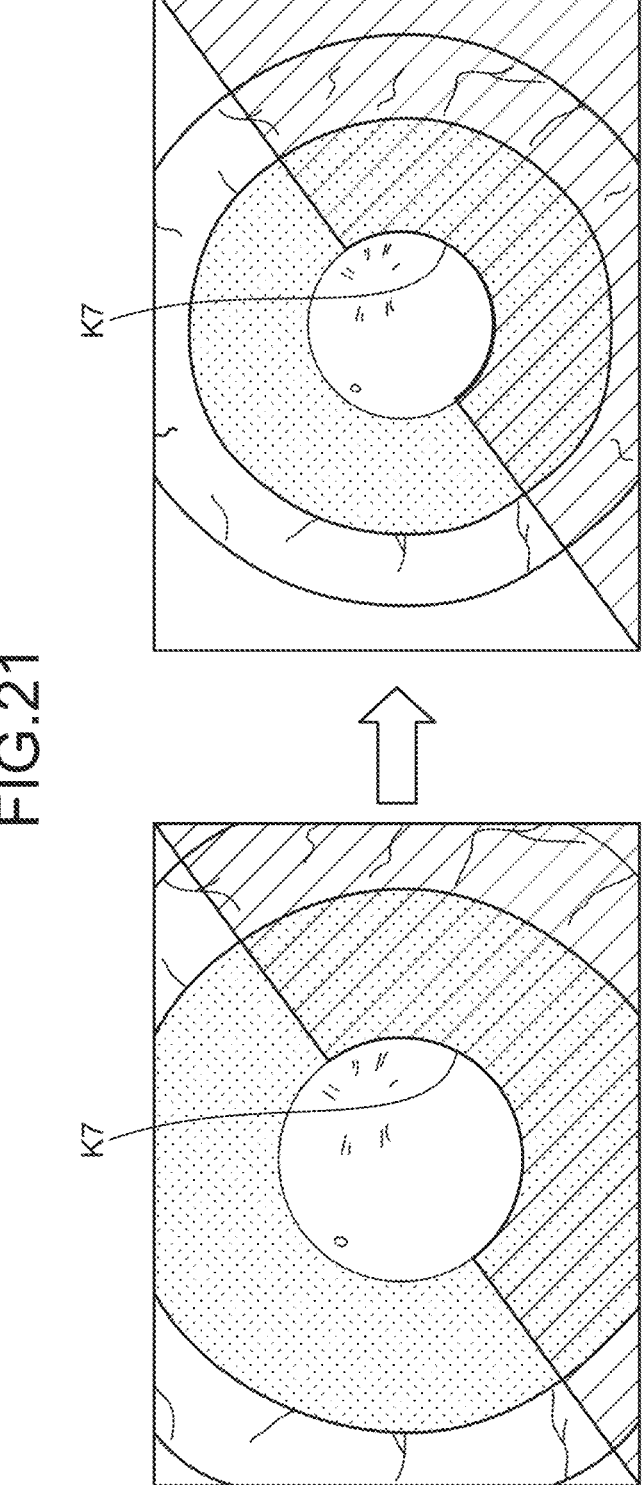
FIG. 21 is a diagram for explaining a change in boundary presentation according to a tracking result according to the embodiment of the present disclosure.

An additional point in a change in boundary presentation according to a tracking status or time according to the embodiment will be described. First, a change in the boundary presentation according to a tracking status will be described with reference to FIG. 17. Next, a change in boundary presentation according to time will be described with reference to FIGS. 18 to 20. A change in boundary presentation according to a tracking result (change in size of an eye) will be described with reference to FIG. 21. FIG. 17 is a diagram for explaining a change in boundary presentation according to the tracking status according to the embodiment. FIGS. 18 to 20 are first to third diagrams for explaining a change in boundary presentation with time according to the embodiment. FIG. 21 is a diagram for explaining a change in boundary presentation according to a tracking result according to the embodiment.

In the principle of eyeball tracking, when an amount of eyeball appearing in an operative field decreases, tracking accuracy deteriorates. Furthermore, a detection limit of tracking may be set in order to maintain tracking accuracy. That is, there may be a situation where there is confidence in the tracking accuracy or a situation where the tracking detection limit is approaching. In such a case, as illustrated in FIG. 17, the intensity of processing (for example, the degree of modulation and the like) of a predetermined region may be weakened to bring an image of the predetermined region close to the original image, or the intensity of processing of the predetermined region may be strengthened to make the image of the predetermined region stand out as warning (warning information). Of course, a message may be overlaid and presented at a fixed position on the display screen together with them. In this way, by presenting the above-described tracking status to the user such as the operator, the user can grasp the reliability of tracking.

Furthermore, in the information presentation based on the boundaries K1 and K7 of the respective regions, occlusion (shielding) of the operative field does not occur in principle, but there is a possibility that some operators may feel a decrease in visibility on the boundaries K1 and K7. Therefore, as illustrated in FIGS. 18 and 19, the positions of the boundaries K1 and K7 that present the same information (specific position) may be changed.

In the example of FIG. 18, a boundary K7 rotates by 360 degrees about the eye axis or the like. For example, the boundary K7 rotates at a predetermined speed (for example, a speed higher than a speed at which the operator moves a distal end portion of a surgical tool) from the start of surgery in surgery such as anterior capsulotomy. This rotation is repeated during the procedure. Accordingly, the boundary K7 forms a target circle for incision of the anterior capsule. In this way, it is possible to improve the visibility by changing the position of the boundary K7 that presents the same information.

Here, the predetermined speed is set in advance, and is, for example, a value faster than a general value such as an average value of speeds when the operator moves the distal end portion of the surgical tool. However, the rotation speed of the boundary K7 may not be a predetermined speed, and for example, the boundary K7 may be rotated according to the movement of the surgical tool or the movement of the end point of the anterior capsule incision edge by detecting the distal end portion of the surgical tool or the end point of the anterior capsule incision edge moved by the operator. Furthermore, a rotation angle of the boundary K7 may be, for example, another angle such as 180 degrees.

In the example of FIG. 19, a boundary K1 translates at a predetermined speed. The boundary K1 moves leftward from a reference position by a predetermined distance, returns from a left predetermined position to the reference position, further moves rightward from the reference position by a predetermined distance, and returns from a right predetermined position to the reference position. This movement is repeated during the operation (periodic movement). As a result, it is possible to improve visibility by changing the position of the boundary K1 that presents the same information.

Furthermore, as illustrated in FIG. 20, the visibility may be improved by periodically weakening the intensity of processing (for example, the degree of modulation and the like) of a predetermined region. In the example of FIG. 20, the intensity of processing is gradually weakened from the initial state, and then gradually strengthened, and is returned to the initial state again. As described above, by periodically weakening the intensity of processing of the predetermined region (the degree of an image change from the original image), the visibility can be improved.

In this manner, by periodically weakening the intensity of processing of the predetermined region (the degree of the image change from the original image), the visibility of the operative field can be further improved. Furthermore, by periodically shifting a presentation position of a boundary K1 such as a toric axis, it is possible to avoid that the boundary K1 overlaps the mark B1*a* (see FIG. 4) of the toric IOL and the mark B1*a* becomes difficult to see. Furthermore, since the tracking accuracy is likely to decrease when the position of the cornea to be tracked comes to the end, it is possible to enhance the visibility of the operative field and to make the user aware of bringing the cornea to the central portion with high tracking accuracy by weakening the intensity of the processing of the predetermined region.

Note that, as described above, the positions of the boundaries K1 and K7 may be changed in a predetermined cycle, or may be switched in accordance with a user's instruction. For example, the user can switch the positions of the boundaries K1 and K7 by operating an operation unit such as a touch panel, a foot switch, or a controller.

Furthermore, image processing may be performed on the predetermined region as described above, or the operation unit (for example, the distal end portion of the surgical tool or the like) such as a surgical tool operated by the operator may be detected, and image processing (for example, luminance modulation processing, color modulation processing, and the like) may be performed on a region not including the operation unit.

Furthermore, as illustrated in FIG. 21, a position and a size of a boundary K7 may be changed according to a size change of the eye. Since a part of the boundary K7 has a semicircular shape and indicates the size of the eye, the position of the boundary K7 changes according to a change in the size of the eye. For example, when the size of the eye in an operative field image decreases, the semicircular size of the boundary K7 also decreases, and the position of the boundary K7 approaches a center. Conversely, when the size of the eye in the operative field image increases, the semicircular size of the boundary K7 also increases, and the position of the boundary K7 is separated from the center. Note that examples of the size include a diameter of CCC, an incision width, and centration.

Examples 12 to 14 of Display Image

Figure 22:
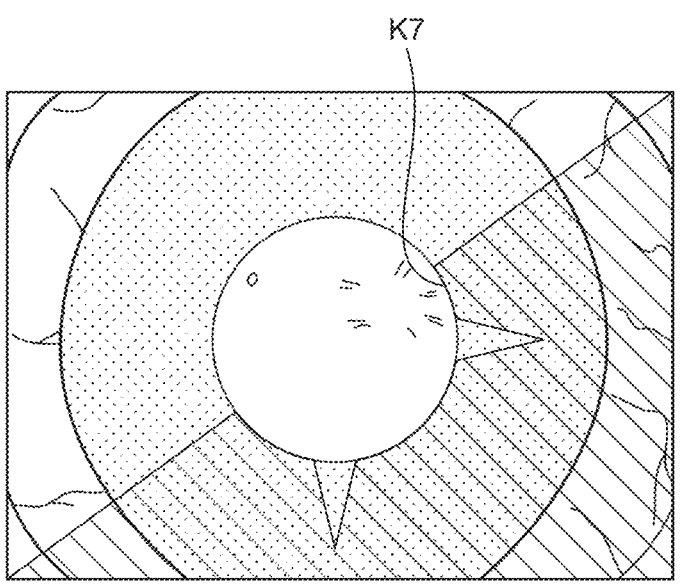
FIG. 22 is a diagram illustrating Example 12 of a display image according to the embodiment of the present disclosure.
Figure 23:
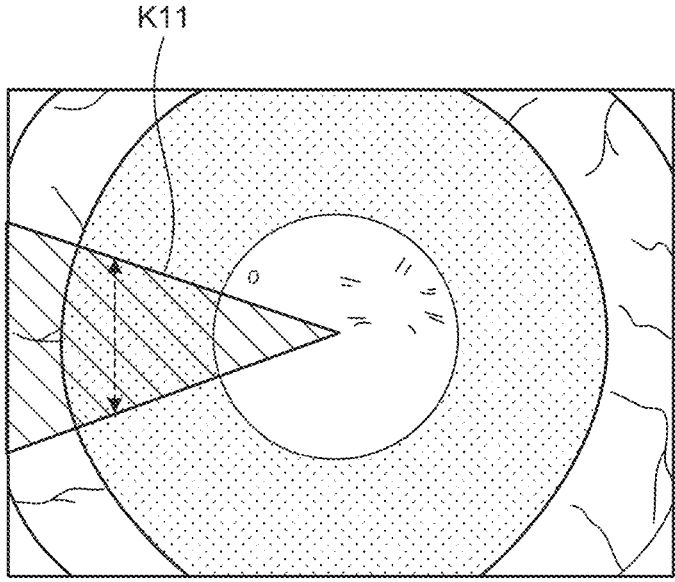
FIG. 23 is a diagram illustrating Example 13 of a display image according to the embodiment of the present disclosure.
Figure 24:
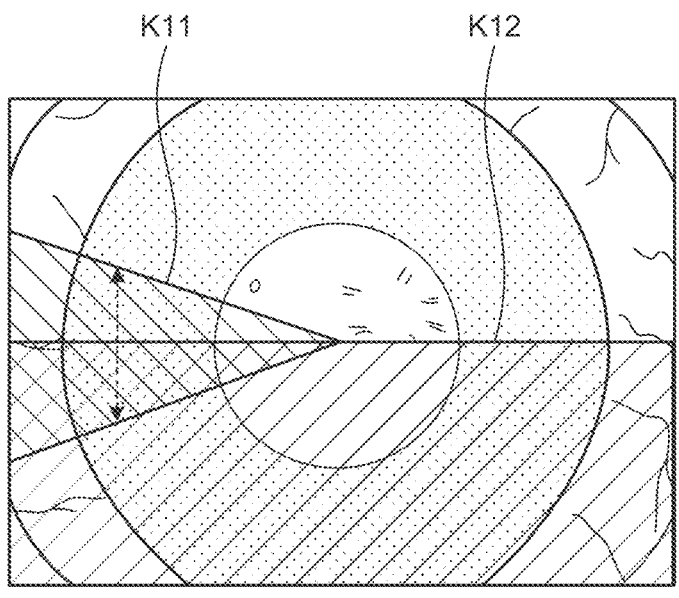
FIG. 24 is a diagram illustrating Example 14 of a display image according to the embodiment of the present disclosure.

Examples 12 to 14 of the display image according to the embodiment will be described with reference to FIGS. 22 to 24. FIGS. 22 to 24 are diagrams illustrating Examples 12 to 14 of the display image according to the embodiment.

As illustrated in FIG. 22, a boundary K7 presents two specific positions in a display image. In the example of FIG. 22, each of the two specific positions indicates wound information (for example, a wound creation position or the like). For example, a part of the boundary K7 is formed in a triangular shape, and the vicinity of the apex is the wound creation position. In the example of FIG. 22, a right region of the boundary K7 in an operative field image is processed.

As illustrated in FIG. 23, a boundary K11 in a display image presents a width and a position of a main wound. In the example of FIG. 23, the boundary K11 indicates an incision width that is a width on a corneal limbus of a triangle made from a corneal center. The position of the main wound, i.e. the position of the incision, is a triangular virtual perpendicular bisector. In the example of FIG. 23, a left region of the boundary K11 in an operative field image is processed.

As illustrate in FIG. 24, in a display image, a boundary K11 presents a width of a main wound and a boundary K12 presents a position of the main wound. In the example of FIG. 24, the boundary K11 indicates an incision width that is a width on a corneal limbus of a triangle made from a corneal center. The boundary K12 indicates the position of the main wound, i.e. a triangular virtual perpendicular bisector. In the example of FIG. 24, a left region of the boundary K11 in an operative field image is processed, and a lower region of the boundary K12 is processed. Note that a left-eye image including the boundary K11 and a right-eye image including the boundary K12 may be presented, and the boundaries K11 and K12 may be fused in the brain to realize a 3D image (see FIG. 16).

(Change in Boundary Presentation)

Figure 25:
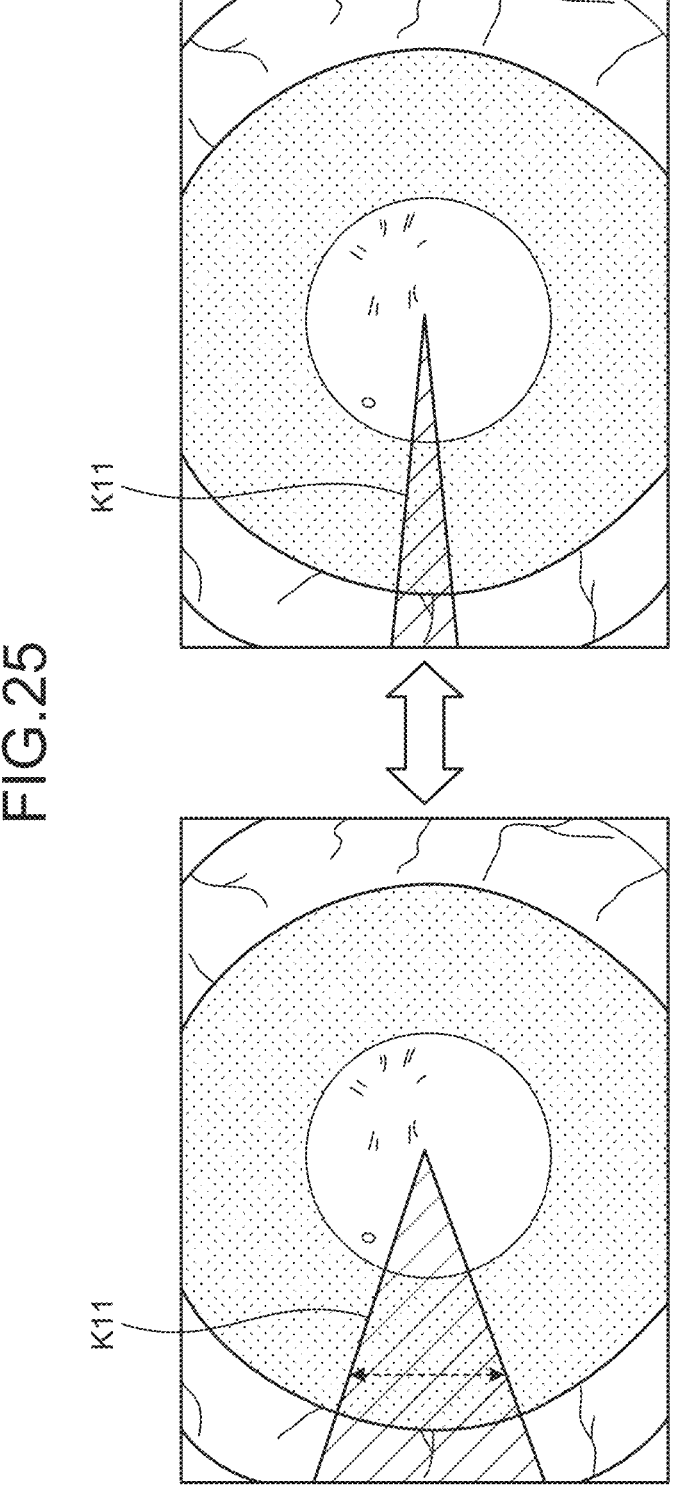
FIG. 25 is a fourth diagram for explaining a change in boundary presentation with time according to the embodiment of the present disclosure.

A change in boundary presentation according to time according to an embodiment will be described with reference to FIG. 25. FIG. 25 is a fourth diagram for explaining a change in boundary presentation with time according to the embodiment.

As illustrated in FIG. 25, a width and a position of a boundary K11 in a display image may be periodically changed. For example, when the width of the boundary K11 (a size of a region within the boundary K11) becomes maximum, a desired incision width is set, and the width of the boundary K11 is narrowed in order to know a position of an incision. That is, if the width of the incision is merely indicated by a width in a corneal limbus, the position of the incision may be difficult to understand. Therefore, the width of the boundary K11 may be changed periodically to narrow the width of the boundary K11, and the position of the incision may be indicated.

<Luminance Region>

Here, Examples 15 to 17 of a display image in a case where boundaries M3 to M5 are indicated by a plurality of luminance regions having different luminance will be described.

Example 15 of Display Image

Figure 26:
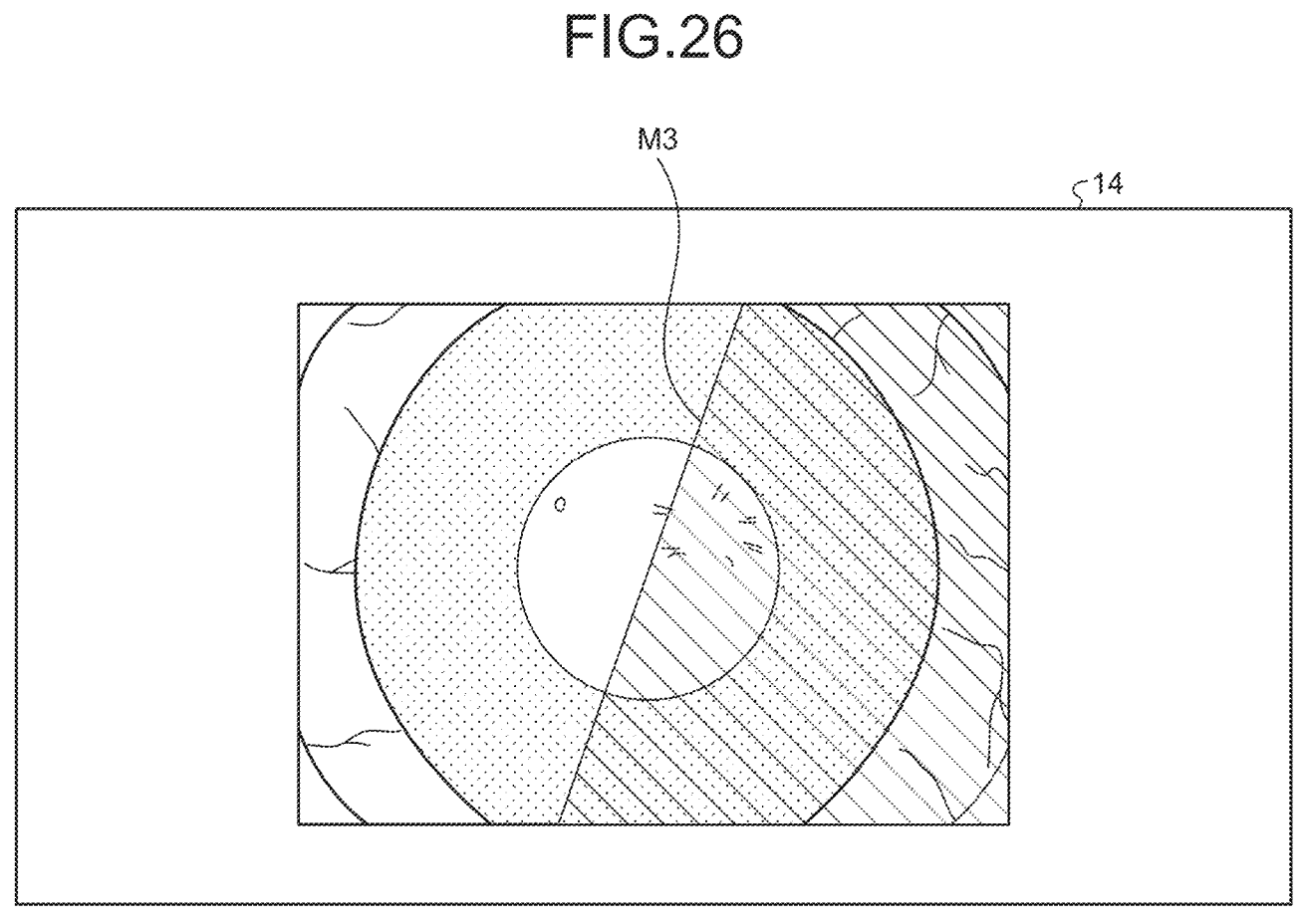

FIG. 26 is a diagram illustrating Example 15 of the display image according to the embodiment. As illustrated in FIG. 26, two luminance regions having different luminance are set, and a boundary M3 of these luminance regions is presented. The boundary M3 functions as a boundary of a line shape, that is, a line boundary (target line for installing the intraocular lens B1). In the example of FIG. 26, the luminance of a right luminance region (shaded region in FIG. 26) of the two luminance regions is set to be lower than the luminance of a left luminance region. The toric axis is aligned with the boundary M3, and the toric IOL is installed. Note that the number of luminance regions is not limited to two, and may be two or more.

Example 16 of Display Image

Figure 27:
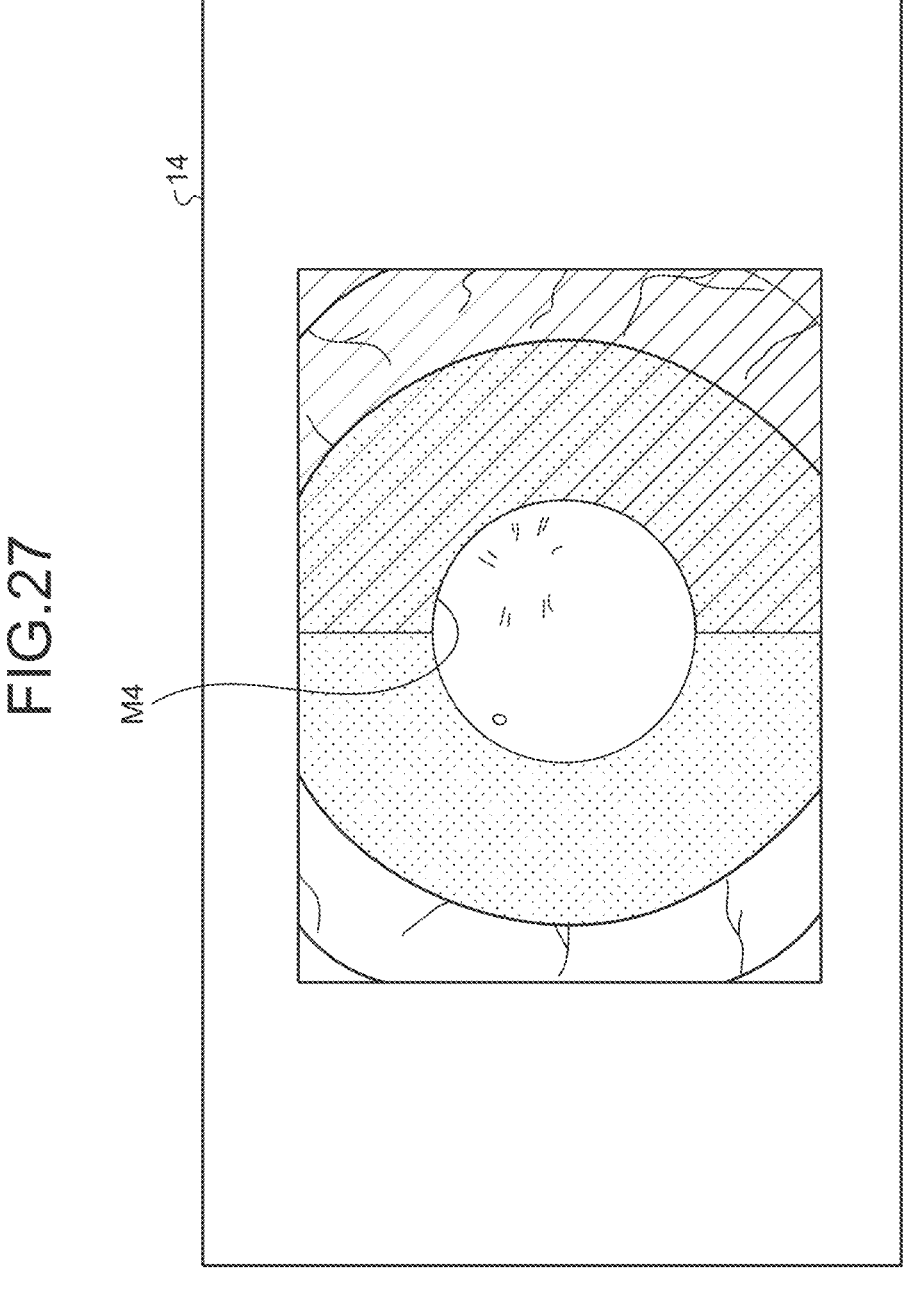
FIG. 27 is a first diagram illustrating Example 16 of a display image according to the embodiment of the present disclosure.
Figure 28:
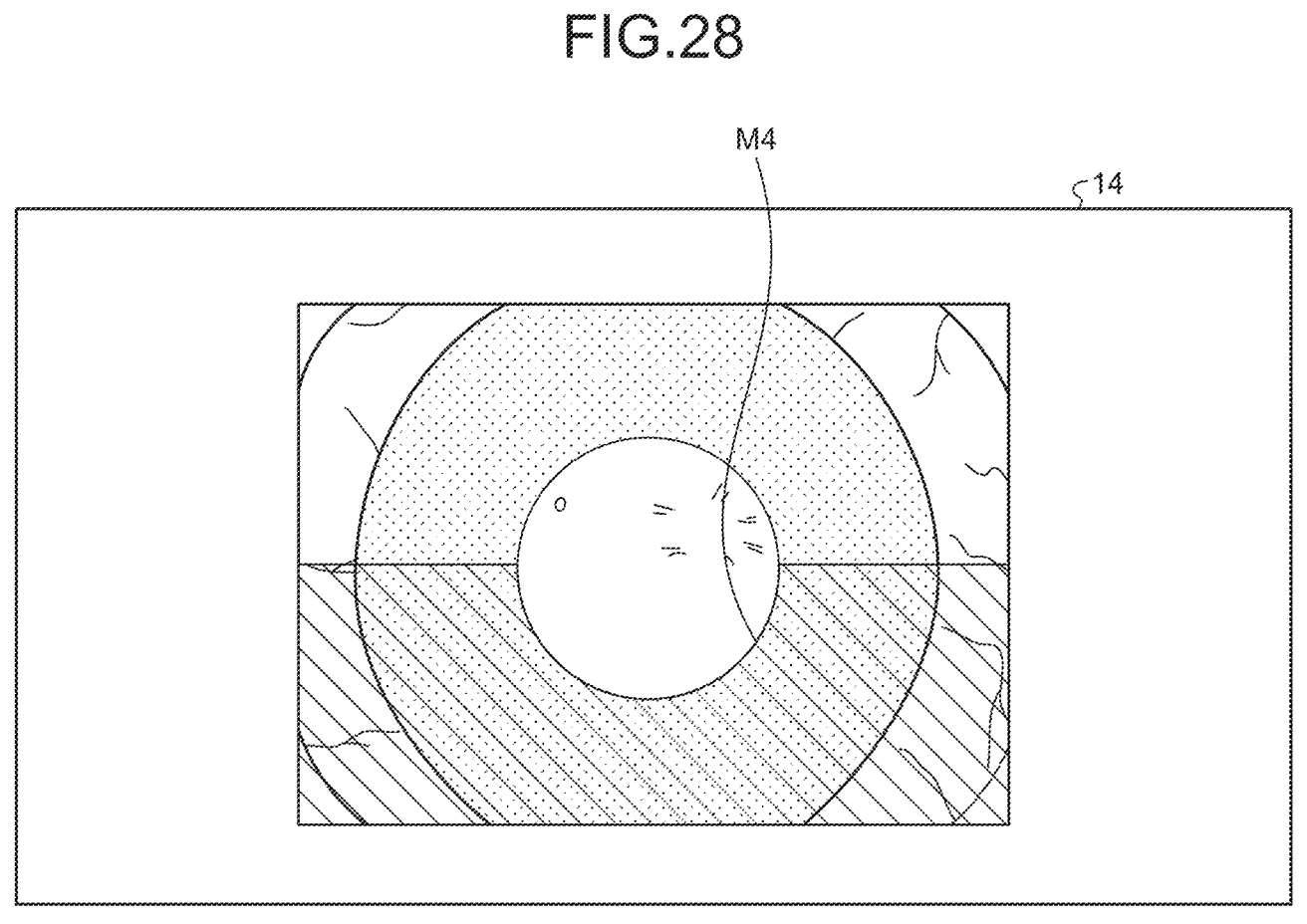

FIGS. 27 and 28 are diagrams illustrating Example 16 of the display image according to the embodiment. As illustrated in FIGS. 27 and 28, two luminance regions having different luminance are set, and are presented as a boundary M4 between the luminance regions. This boundary M4 serves as a boundary of a shape having a semicircle, that is, a semi-circle boundary (semicircle for forming a target circle for anterior capsule incision). In the examples of FIGS. 27 and 28, the boundary M4 of the luminance region is rotated by 90 degrees about the eye axis or the like.

For example, the boundary M4 of the luminance region rotates 360 degrees about the eye axis or the like at a predetermined speed (for example, the speed at which the operator moves the distal end portion of the surgical tool) from the start of surgery in surgery such as anterior capsulotomy. As a result, the boundary M4 forms a target circle for incision of the anterior capsule. The predetermined speed is set in advance, and is, for example, a general value such as an average value of speeds when the operator moves the distal end portion of the surgical tool. However, the rotation speed of the boundary M4 may not be the predetermined speed, and for example, the distal end portion of the surgical tool to be moved by the operator or the end point of the anterior capsule incision edge may be detected, and the boundary M4 may be rotated according to the movement of the surgical tool or the movement of the end point of the anterior capsule incision edge. A treatment start portion 13g to be described later can be used to detect the distal end portion of the surgical tool and the end point of the anterior capsule incision edge. Furthermore, the rotation angle of the boundary M4 may be, for example, another angle such as 180 degrees.

Example 17 of Display Image

Figure 29:
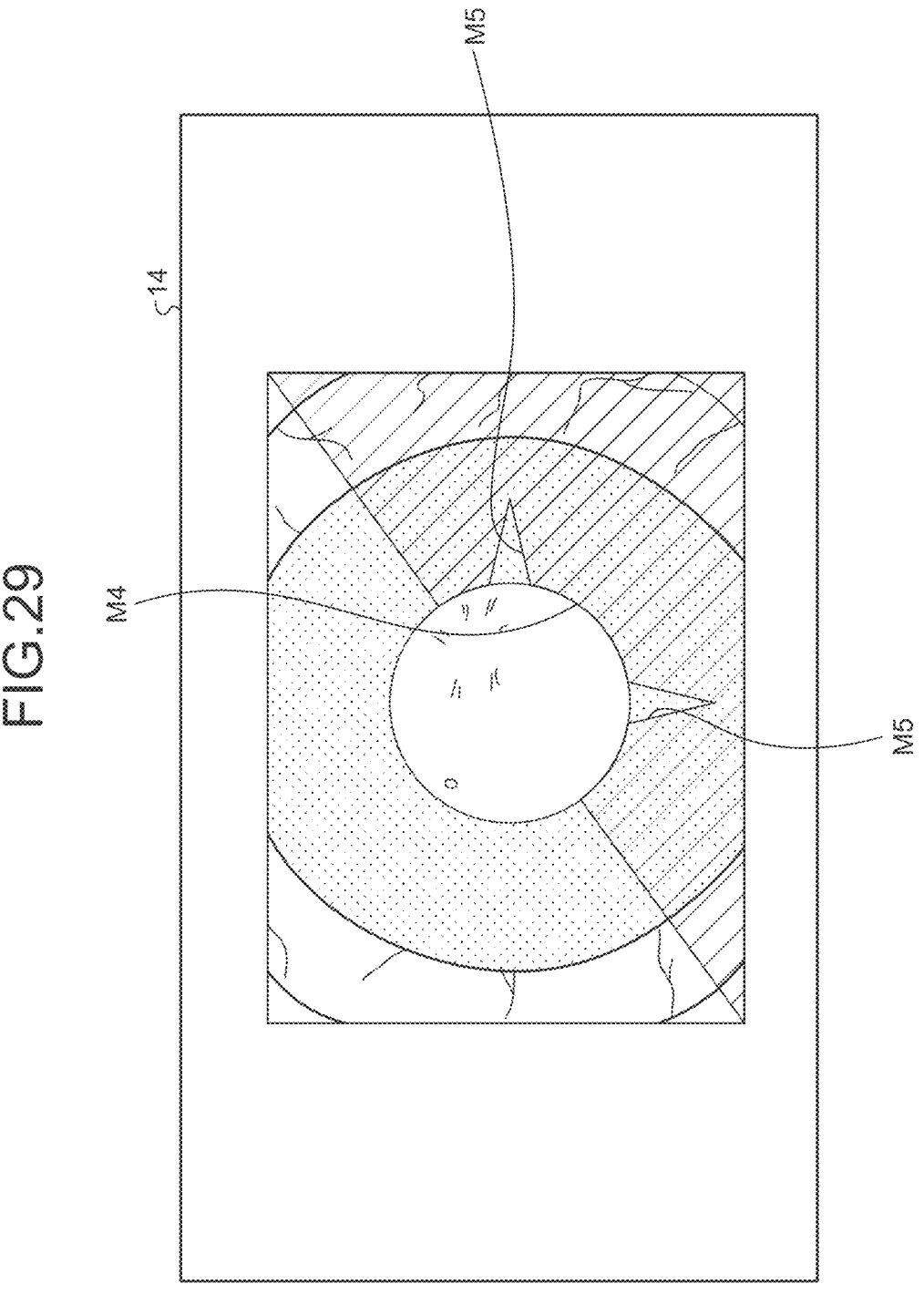
FIG. 29 is a diagram illustrating Example 17 of a display image according to the embodiment of the present disclosure.

FIG. 29 is a diagram illustrating Example 17 of the display image according to the embodiment. As illustrated in FIG. 29, in addition to the boundary M4 illustrated in FIGS. 27 and 28, a plurality of (two in the example of FIG. 29) boundaries M5 are further presented. Similarly to Example 10 of the display image, the boundary M4 and the boundaries M5 are formed by boundaries of two luminance regions having different luminance. Each of the boundaries M5 is a boundary indicating an incision position.

As described above, as is clear from the above description, the boundaries K1 to K12 and M3 to M5 are not marks superimposed and displayed on the operative field image, but are boundaries that can indicate the posture (position, direction, size, and the like) for visual recognition. Since the boundaries K1 to K12 and M3 to M5 do not hide the operative field image at the position of the mark unlike the superimposed mark, the effect of improving the visibility of the operative field can be obtained as compared with the case of using the superimposed mark.

Furthermore, as described above, the operative field image may be fixed, and the postures of the boundaries K1 to K12 and M3 to M5 may be changed so that the boundaries K1 to K12 and M3 to M5 become appropriate postures (positions, directions, and the like) with respect to the fixedly presented operative field image (For example, the displacements of the boundaries K1 to K12 and M3 to M5 with respect to the eyeball in the operative field image in the fixed posture are eliminated.). Changing the postures of the boundaries K1 to K12 and M3 to M5 changes a range (for example, size, shape, and the like) of each region.

For example, when changing the postures of the boundaries K1 to K12 and M3 to M5, the display image generation unit 13*f* generates the display image while changing the postures of the boundaries K1 to K12 and M3 to M5 according to the displacement of the eyeball on the basis of the posture information of the eyeball. For example, the display image generation unit 13*f* moves the boundaries K1 to K12 and M3 to M5 in the movement direction of the eyeball by the above-described movement amount with respect to the real time operative field image according to the movement direction and the movement amount of the eyeball, and changes the postures (for example, the range of each region) of the boundaries K1 to K12 and M3 to M5. That is, by fixing the operative field image and changing the postures of the boundaries K1 to K12 and M3 to M5, the positional relationship between the eyeball and the boundaries K1 to K12 and M3 to M5 does not change.

Furthermore, the tracking processing may fail, and a time at which the posture (position, direction, or the like) of the eye in the real time image cannot be estimated may occur. In such a case, the display image generation unit 13*f* may continue the display by maintaining the posture of the image (last display image) at the time when the posture was able to be estimated last. Note that, in addition to maintaining the posture of the operative field image at the time when the posture can be estimated last, the posture of the operative field image at the time when the posture can be estimated may be maintained by constant velocity, constant angular velocity, constant acceleration motion, or constant angular acceleration motion. Furthermore, when the tracking fails, the display mode (for example, luminance, color, and the like) of a predetermined area may be changed so that the failure can be recognized.

Although various display images as described above are used, these display images may be selectable by an operator, a staff member, or the like. Selection of the display image is realized by an input operation on an operation unit by the operator, the staff member, or the like. For example, the operator, the staff member, or the like operates the operation unit to select a display mode for displaying a desired display image. In response to this selection, the display image generation unit 13*f* generates a display image based on the selected display mode. Similarly, regarding various images, the size, the position, and the like of the image may be changeable by the operator, the staff member, or the like. The display image generation unit 13*f* generates a display image by changing the size, the position, and the like of the image in accordance with an input operation on the operation unit by the operator, the staff member, or the like.

<1-4. Working and Effect>

As described above, according to the embodiment, the image input unit 13*b* receives the operative field image with respect to the eye of the patient, the eyeball tracking unit 13*e* tracks the eyeball in the operative field image, the display image generation unit 13*f* sets a plurality of regions having different display modes with respect to the operative field image, generates the display image in which the boundary (for example, boundaries K1 to K12 and M3 to M5) of each region indicates at least one of the specific position, the specific direction, and the specific size with respect to the eye, and further, changes the display mode of any or all of the regions on the basis of the tracking result of the eyeball, and changes at least one of the position, the direction, and the size of the boundary. This makes it possible to prevent the occurrence of occlusion by presenting the specific position with respect to the eye not by the mark but by the boundary of each region having a different display mode. Therefore, the operator can easily see the operative field image while grasping the specific position or the specific size, and can accurately perform the surgery, so that the surgery according to the preoperative plan can be realized with high accuracy. Note that the displacement includes any change with respect to a subject such as an eyeball, such as translation, rotation, enlargement/reduction, deformation, or a combination thereof.

Furthermore, since the display image generation unit 13*f* changes the display mode of any or all of the plurality of regions on the basis of the tracking result of the eyeball and changes at least one of the position, direction, and size of the boundary, for example, when changing the display mode of any of the plurality of regions, the processing speed can be improved as compared with the case of changing the display mode of all of the plurality of regions. Furthermore, in a case where the display mode of all of the plurality of regions is changed, the operator can easily visually recognize the boundary of each region as compared with a case where the display mode of any of the plurality of regions is changed, and thus, it is possible to realize the surgery according to the preoperative plan with high accuracy.

Furthermore, the preoperative plan receiving unit 13*a* receives at least one piece of information (for example, a position, a direction, a size, and the like on coordinates) of the position, direction, and size of the preoperative image and the index based on the preoperative plan for the eye of the patient, and the information accumulation unit 13*d* changes at least one piece of information of the position, direction, and size of the index in accordance with the operative field image at the start of surgery by comparing the preoperative image with the operative field image at the start of surgery, and accumulates the operative field image at the start of surgery and at least one piece of information of the changed position, direction, and size of the index. As a result, the operative field image at the start of surgery and at least one piece of information of the changed position, direction, and size of the index can be used in the post-processing.

The eyeball tracking unit 13*e* tracks the eyeball in the real time operative field image by comparing the operative field image at the start of surgery with the real time operative field image, and outputs relationship information indicating a relationship between at least one piece of information (for example, a position, a direction, a size, and the like on coordinates) of a position, a direction, and a size of the eyeball in the real time operative field image and at least one piece of information of the changed position, direction, and size of the index. The display image generation unit 13*f* arranges a boundary on the basis of at least one piece of information of the changed position, direction, and size of the index, and changes at least one of the position, the direction, and the size of the boundary in the real time operative field image on the basis of the relationship information so as to eliminate a change in at least one of the position, the direction, and the size of the boundary with respect to the eyeball in the operative field image at the start of surgery, and generates the display image. As a result, by changing at least one of the position, direction, and size of the boundaries K1 to K7 with respect to the eyeball in the operative field image at the start of surgery, the relationship of at least one of the position, direction, and size between the eyeball and the boundaries K1 to K7 does not change. Therefore, since the operator can grasp at least one of the specific position, direction, and size in detail, it is possible to realize the surgery according to the preoperative plan with higher accuracy.

Furthermore, the display image generation unit 13*f* changes the plurality of regions by coordinate transformation such that at least one of the position, the direction, and the size of the boundary is changed on the basis of the tracking result of the eyeball, and generates the display image. As a result, at least one of the position, the direction, and the size of the boundary can be reliably changed on the basis of the tracking result of the eyeball, and the display image can be generated.

Furthermore, the display image generation unit 13*f* changes the boundary line indicating the boundary on the basis of the tracking result of the eyeball, and changes at least one of the position, the direction, and the size of the boundary. As a result, the processing speed can be improved as compared with the case of changing the region. For example, the boundary line may be two control points (transformation points), but the region requires three or more control points.

Furthermore, the display image generation unit 13*f* performs processing of adjusting the same type of parameter (for example, luminance, color, and the like) for two or more of the plurality of regions. This simple process makes it possible to easily make the boundary of each region conspicuous. As a result, since the operator can easily visually recognize the boundary of each region, it is possible to realize the surgery according to the preoperative plan with high accuracy.

Furthermore, the display image generation unit 13*f* performs processing of adjusting different types of parameters (for example, luminance, color, and the like) for two or more of the plurality of regions. This simple process makes it possible to easily make the boundary of each region conspicuous. As a result, since the operator can easily visually recognize the boundary of each region, it is possible to realize the surgery according to the preoperative plan with high accuracy.

Furthermore, the display image generation unit 13*f* weakens the intensity of processing for any or all of the plurality of regions as it goes away from the boundary. As a result, it is possible to bring the region away from the boundary close to the original image while maintaining the clarity of the boundary, and thus, it is possible to realize the surgery according to the preoperative plan with high accuracy.

Furthermore, the display image generation unit 13*f* generates the display image including the boundary as either the display image for the left eye (for the left eye in the stereoscopic view) or the display image for the right eye (for the right eye in the stereoscopic view), or generates the display image including the boundary as the display image for the left eye and the display image for the right eye, respectively. As a result, in a case where the display image including the boundary is generated as one of the display image for the left eye and the display image for the right eye, the processing speed can be improved as compared with a case where the display image including the boundary is generated as the display image for the left eye and the display image for the right eye. Furthermore, in a case where the display image including the boundary is generated as the display image for the left eye and the display image for the right eye, respectively, the positional accuracy of the boundary can be improved as compared with a case where the display image including the boundary is generated as one of the display image for the left eye and the display image for the right eye.

Furthermore, the eyeball tracking unit 13*e* tracks the eyeball in the operative field image for one or both of the left eye and the right eye, and the display image generation unit 13*f* changes at least one of the position, direction, and size of the boundary on the basis of the tracking result of the eyeball for one or both of the left eye and the right eye, and generates the display image for the left eye and the display image for the right eye. As a result, in a case where one of the operative field images for the left eye and the right eye is used, the processing speed can be improved as compared with a case where both the operative field images are used. In a case where both operative field images are used, the positional accuracy of the boundary can be improved as compared with a case where one of the operative field images is used.

Furthermore, the display image generation unit 13*f* sets the boundaries at the same position in the display image for the left eye and the display image for the right eye. As a result, the operator can easily grasp the position of the boundary, and thus, it is possible to realize the surgery according to the preoperative plan with high accuracy.

Furthermore, the display image generation unit 13*f* generates a display image in which at least one of the position, the direction, and the size of the boundary is different between the left-eye display image and the right-eye display image so as to indicate at least one of the specific position, the specific direction, and the specific size. As a result, it is possible to indicate at least one of the specific position, the specific direction, and the specific size at the plurality of boundaries, and thus, it is possible to realize the surgery according to the preoperative plan with high accuracy.

Furthermore, the display image generation unit 13*f* shifts the display image for the left eye and the display image for the right eye on the basis of the depth information of the desired localization of the three-dimensional image including the display image for the left eye and the display image for the right eye, and generates a three-dimensional image. As a result, since the operator can more easily grasp the position of the boundary, it is possible to realize the surgery according to the preoperative plan with high accuracy.

Furthermore, in a case where the eyeball deviates from the tracking of the eyeball by the eyeball tracking unit 13*e*, the display image generation unit 13*f* maintains the last display image before the eyeball deviates. As a result, it is possible to avoid interruption of the surgery due to the disappearance of the display image, and thus, it is possible to realize the surgery according to the preoperative plan with high accuracy.

Furthermore, the display image generation unit 13*f* changes the display mode of any or all of the plurality of regions according to the time period. As a result, the display image can be brought close to the original image or the boundary of the display image can be made conspicuous periodically. Therefore, since the operator can reliably visually recognize the original image and the boundary, the surgery according to the preoperative plan can be realized with high accuracy.

Furthermore, the display image generation unit 13*f* generates a display image in which the boundary indicates a plurality of specific positions. As a result, it is possible to present more specific positions, and thus, it is possible to realize the surgery according to the preoperative plan with high accuracy.

Furthermore, the display image generation unit 13*f* changes the size of any or all of the plurality of regions according to the size change of the eyeball. As a result, one or a plurality of region sizes can be changed in accordance with the size of the eyeball, and the position, size, and the like of the boundary can be changed, so that the surgery according to the preoperative plan can be realized with high accuracy.

Furthermore, the display image generation unit 13*f* changes the size of any or all of the plurality of regions according to the time period. As a result, it is possible to periodically change the size of one or a plurality of regions and change the position, size, and the like of the boundary, and thus, it is possible to realize the surgery according to the preoperative plan with high accuracy. Furthermore, for example, the display image can be brought close to the original image by reducing the region, and the operator can reliably visually recognize the original image, so that surgery according to the preoperative plan can be realized with high accuracy.

Furthermore, a display mode of each of the plurality of regions differs depending on a difference in luminance of each of the plurality of regions. This makes it possible to easily make the boundary of each region conspicuous. Therefore, since the operator can easily visually recognize the boundary of each region, the surgery according to the preoperative plan can be realized with high accuracy.

Furthermore, the specific position is the toric axis arrangement position of the intraocular lens, and the display image generation unit 13*f* changes the luminance of each of the plurality of regions such that the boundary indicates the toric axis arrangement position. This makes it possible to easily make the toric axis arrangement position conspicuous. Therefore, since the operator can easily visually recognize the toric axis arrangement position, it is possible to realize the surgery according to the preoperative plan with high accuracy.

Furthermore, the specific position is any one of the toric axis arrangement position of the intraocular lens, the incision position for forceps insertion, the incision position of anterior capsule incision, the eye axis position, the corneal limbus center, the pupil center, the preoperative pupil center, the visual axis position, and the anterior capsule incision edge center. As a result, any one of the toric axis arrangement position of the intraocular lens, the incision position for forceps insertion, the incision position of anterior capsule incision, the eye axis position, the corneal limbus center, the pupil center, the preoperative pupil center, the visual axis position, and the anterior capsule incision edge center can be made conspicuous at the boundary of each region. Therefore, since the operator can easily visually recognize these specific positions, it is possible to realize the surgery according to the preoperative plan with high accuracy.

Furthermore, the display image generation unit 13*f* changes the display mode of any or all of the plurality of regions according to the tracking status of the eyeball by the eyeball tracking unit 13*e*. As a result, the display image can be brought close to the original image or the boundary of the display image can be made conspicuous according to the tracking status of the eyeball, so that the operator can grasp the tracking status of the eyeball (for example, reliability of tracking or the like).

2. Example of Schematic Configuration of Computer

The above-described series of processing can be executed by hardware or software. In a case where the series of processing is executed by software, a program constituting the software is installed in a computer. Here, examples of the computer include a computer incorporated in dedicated hardware, a general-purpose personal computer capable of executing various functions by installing various programs, and the like.

Figure 30:
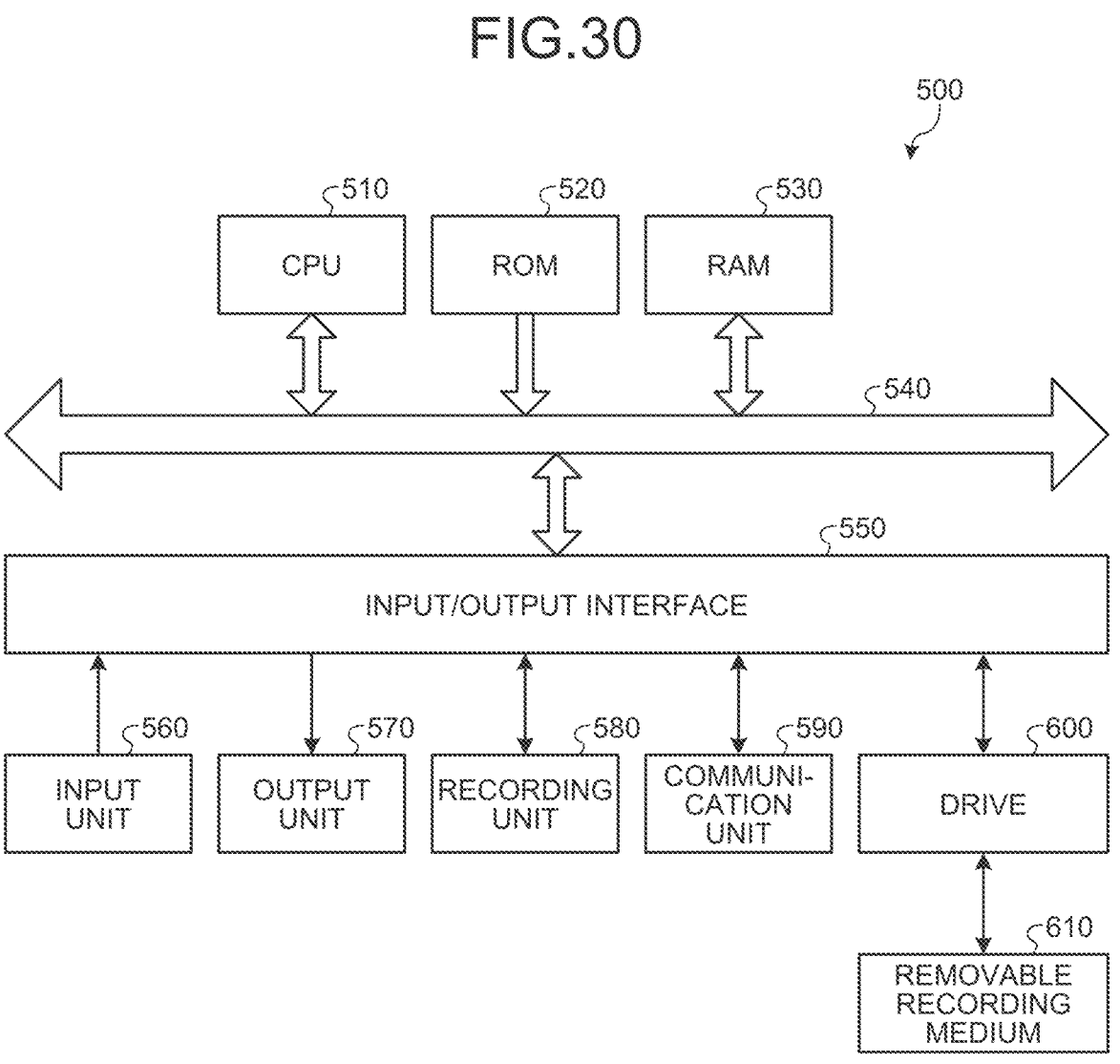
FIG. 30 is a diagram illustrating an example of a schematic configuration of a computer according to the embodiment of the present disclosure.

FIG. 30 is a diagram illustrating an example of a schematic configuration of a computer 500 that executes the above-described series of processing by a program.

As illustrated in FIG. 30, the computer 500 includes a central processing unit (CPU) 510, a read only memory (ROM) 520, and a random access memory (RAM) 530.

The CPU 510, the ROM 520, and the RAM 530 are connected to one another by a bus 540. An input/output interface 550 is further connected to the bus 540. An input unit 560, an output unit 570, a recording unit 580, a communication unit 590, and a drive 600 are connected to the input/output interface 550.

The input unit 560 includes a keyboard, a mouse, a microphone, an imaging element, and the like. The output unit 570 includes a display, a speaker, and the like. The recording unit 580 includes a hard disk, a nonvolatile memory, and the like. The communication unit 590 includes a network interface and the like. The drive 600 drives a removable recording medium 610 such as a magnetic disk, an optical disk, a magneto-optical disk, or a semiconductor memory.

In the computer 500 configured as described above, for example, the CPU 510 loads a program recorded in the recording unit 580 into the RAM 530 via the input/output interface 550 and the bus 540 and executes the program, whereby the above-described series of processing is performed.

The program executed by the computer 500, that is, the CPU 510 can be provided by being recorded in the removable recording medium 610 as a package medium or the like, for example. Furthermore, the program can be provided via a wired or wireless transmission medium such as a local area network, the Internet, or digital satellite broadcasting.

In the computer 500, the program can be installed in the recording unit 580 via the input/output interface 550 by attaching the removable recording medium 610 to the drive 600. Furthermore, the program can be received by the communication unit 590 via a wired or wireless transmission medium and installed in the recording unit 580. In addition, the program can be installed in the ROM 520 or the recording unit 580 in advance.

Note that the program executed by the computer 500 may be a program in which processing is performed in time series in the order described in the present specification, or may be a program in which processing is performed in parallel or at necessary timing such as when a call is made.

Furthermore, in the present specification, a system means a set of a plurality of components (devices, modules (parts), etc.), and it does not matter whether or not all the components are in the same housing. Therefore, a plurality of devices housed in separate housings and connected via a network, and one device in which a plurality of modules is housed in one housing are both systems.

Furthermore, the embodiments of the present technique are not limited to the above-described embodiments, and various modifications can be made without departing from the gist of the present technique.

For example, the present technique can have a configuration of cloud computing in which one function is shared and processed in cooperation by a plurality of devices via a network.

Furthermore, each step described in the above-described processing flow (for example, a flowchart) can be executed by one device or can be shared and executed by a plurality of devices.

Moreover, in a case where a plurality of processing is included in one step, the plurality of processing included in the one step can be executed by one device or can be shared and executed by a plurality of devices.

Furthermore, the effects described in the present specification are merely examples and are not limited, and effects other than those described in the present specification may be provided.

3. Supplementary Note

Note that the present technique can also have the following configurations.

(1)

An image processing apparatus comprising:

an image input unit that receives an operative field image for an eye of a patient;

an eyeball tracking unit that tracks an eyeball in the operative field image; and a display image generation unit that sets a plurality of regions having different display modes for the operative field image and generates a display image in which a boundary of the plurality of regions indicates at least one of a specific position, a specific direction, and a specific size with respect to the eye, wherein the display image generation unit changes a display mode of any or all of the plurality of regions based on a tracking result of the eyeball, and changes at least one of a position, a direction, and a size of the boundary.

(2)

The image processing apparatus according to (1), further comprising:

a preoperative plan receiving unit that receives information of at least one of a position, a direction, and a size of a preoperative image and an index based on a preoperative plan for the eye; and an information accumulation unit that changes at least one piece of information of the position, the direction, and the size of the index in accordance with the operative field image at a start of surgery by comparing the preoperative image with the operative field image at the start of surgery, and accumulates the operative field image at the start of surgery and at least one piece of information of the changed position, direction, and size of the index.

(3)

The image processing apparatus according to (2), wherein the eyeball tracking unit tracks the eyeball in the operative field image of real time by comparing the operative field image at the start of surgery with the real time operative field image, and outputs relationship information indicating a relationship between at least one piece of information of a position, a direction, and a size of the eyeball in the real time operative field image and at least one piece of information of the changed position, direction, and size of the index, and the display image generation unit arranges the boundary based on at least one piece of information of the changed position, direction, and size of the index, changes at least one of a position, a direction, and a size of the boundary in the real time operative field image so as to eliminate a change in at least one of the position, the direction, and the size of the boundary with respect to the eyeball in the operative field image at the start of surgery based on the relationship information, and generates the display image.

(4)

The image processing apparatus according to any one of (1) to (3), wherein the display image generation unit changes the plurality of regions by coordinate transformation such that at least one of the position, the direction, and the size of the boundary is changed based on a tracking result of the eyeball, and generates the display image.

(5)

The image processing apparatus according to any one of (1) to (3), wherein the display image generation unit changes a boundary line indicating the boundary based on a tracking result of the eyeball, and changes at least one of the position, the direction, and the size of the boundary.

(6)

The image processing apparatus according to any one of (1) to (5), wherein the display image generation unit performs processing of adjusting a same type of parameters for two or more of the plurality of regions.

(7)

The image processing apparatus according to any one of (1) to (6), wherein the display image generation unit performs processing of adjusting different types of parameters for two or more of the plurality of regions.

(8)

The image processing apparatus according to any one of (1) to (7), wherein the display image generation unit weakens an intensity of processing for any or all of the plurality of regions as a distance from the boundary increases.

(9)

The image processing apparatus according to any one of (1) to (8), wherein the display image generation unit generates the display image as either one of a display image for stereoscopic left eye and a display image for stereoscopic right eye, or generates the display image as a display image for stereoscopic left eye and a display image for stereoscopic right eye, respectively.

(10)

The image processing apparatus according to (9), wherein the eyeball tracking unit tracks the eyeball in the operative field image for one or both of stereoscopic left eye and stereoscopic right eye, and the display image generation unit changes at least one of the position, the direction, and the size of the boundary based on a tracking result of the eyeball for one or both of stereoscopic left eye and stereoscopic right eye, and generates a display image for the stereoscopic left eye and a display image for the stereoscopic right eye.

(11)

The image processing apparatus according to (9) or (10), wherein the display image generation unit sets the boundary at a same position in the display image for the stereoscopic left eye and the display image for the stereoscopic right eye.

(12)

The image processing apparatus according to (9) or (10), wherein the display image generation unit generates the display image in which at least one of the position, the direction, and the size of the boundary is different between the display image for the stereoscopic left eye and the display image for the stereoscopic right eye so as to indicate at least one of the specific position, the specific direction, and the specific size.

(13)

The image processing apparatus according to any one of (9) to (12), wherein the display image generation unit shifts the display image for the stereoscopic left eye and the display image for the stereoscopic right eye based on depth information of desired localization of a three-dimensional image including the display image for the stereoscopic left eye and the display image for the stereoscopic right eye, and generates the three-dimensional image.

(14)

The image processing apparatus according to any one of (1) to (13), wherein when the eyeball deviates from tracking of the eyeball by the eyeball tracking unit, the display image generation unit maintains a last display image before the eyeball deviates.

(15)

The image processing apparatus according to any one of (1) to (14), wherein the display image generation unit changes a display mode of any or all of the plurality of regions according to a time period.

(16)

The image processing apparatus according to any one of (1) to (15), wherein the display image generation unit generates the display image in which the boundary indicates a plurality of the specific positions.

(17)

The image processing apparatus according to any one of (1) to (16), wherein the display image generation unit changes a size of any or all of the plurality of regions according to a size change of the eyeball.

(18)

The image processing apparatus according to any one of (1) to (17), wherein the display image generation unit changes a size of any or all of the plurality of regions according to a time period.

(19)

The image processing apparatus according to any one of (1) to (18), wherein the display mode of each of the plurality of regions differs depending on a difference in luminance of each of the plurality of regions.

(20)

The image processing apparatus according to (19), wherein the specific position is a toric axis arrangement position of an intraocular lens, and the display image generation unit changes luminance of each of the plurality of regions such that the boundary indicates the toric axis arrangement position.

(21)

The image processing apparatus according to any one of (1) to (20), wherein the specific position is any one of a toric axis arrangement position of an intraocular lens, an incision position for forceps insertion, an incision position of anterior capsule incision, an eye axis position, a corneal limbus center, a pupil center, a preoperative pupil center, a visual axis position, and an anterior capsule incision edge center.

(22)

An image processing method performed by an image processing apparatus, the method comprising:

receiving an operative field image for an eye of a patient;

tracking an eyeball in the operative field image; and setting a plurality of regions having different display modes for the operative field image and generating a display image in which a boundary of the plurality of regions indicates at least one of a specific position, a specific direction, and a specific size with respect to the eye, wherein the image processing apparatus changes a display mode of any or all of the plurality of regions based on a tracking result of the eyeball, and changes at least one of a position, a direction, and a size of the boundary.

(23)

A surgical microscope system comprising:

a surgical microscope that obtains an operative field image for an eye of a patient;

an image processing apparatus that generates a display image; and a display device that displays the display image, wherein the image processing apparatus includes:

an image input unit that receives the operative field image;

an eyeball tracking unit that tracks an eyeball in the operative field image; and a display image generation unit that sets a plurality of regions having different display modes for the operative field image and generates the display image in which a boundary of the plurality of regions indicates at least one of a specific position, a specific direction, and a specific size with respect to the eye, and the display image generation unit changes a display mode of any or all of the plurality of regions based on a tracking result of the eyeball, and changes at least one of a position, a direction, and a size of the boundary.

(24)

An image processing method using the image processing apparatus according to any one of (1) to (21).

(25)

A surgical microscope system including the image processing apparatus according to any one of (1) to (21).

REFERENCE SIGNS LIST

1 SURGICAL MICROSCOPE SYSTEM
10 SURGICAL MICROSCOPE
11 OBJECTIVE LENS
12 EYEPIECE LENS
13 IMAGE PROCESSING APPARATUS
13A CONTROL UNIT
13a PREOPERATIVE PLAN RECEIVING UNIT
13b IMAGE INPUT UNIT
13c REGISTRATION UNIT
13d INFORMATION ACCUMULATION UNIT
13e EYEBALL TRACKING UNIT
13f DISPLAY IMAGE GENERATION UNIT
14 MONITOR
20 PATIENT BED
51 LIGHT SOURCE
52 OBSERVATION OPTICAL SYSTEM
52a HALF MIRROR
53 FRONT IMAGE CAPTURING UNIT
54 TOMOGRAPHIC IMAGE CAPTURING UNIT
55 PRESENTATION UNIT
56 INTERFACE UNIT
57 SPEAKER
500 COMPUTER
510 CPU
520 ROM
530 RAM
540 BUS
550 INPUT/OUTPUT INTERFACE
560 INPUT UNIT
570 OUTPUT UNIT
580 RECORDING UNIT
590 COMMUNICATION UNIT
600 DRIVE
610 REMOVABLE RECORDING MEDIUM

The invention claimed is:

1. An image processing apparatus comprising:
processing circuitry configured to:
   receive an operative field image for an eye of a patient;
   track an eyeball in the operative field image;
   set a plurality of regions having different display modes for the operative field image;
   generate a display image in which a boundary of the plurality of regions indicates at least one of a specific position, a specific direction, or a specific size with respect to the eye;
   change a display mode of any or all of the plurality of regions based on a tracking result of the eyeball;
   change at least one of a position, a direction, or a size of the boundary;

weaken an intensity of processing for any or all of the plurality of regions as a distance from the boundary increases; and
   when the eyeball deviates from tracking of the eyeball, maintain a last display image before the eyeball deviates.

2. The image processing apparatus according to claim 1, wherein the processing circuitry is configured to:
   receive information of at least one of a position, a direction, or a size of a preoperative image and an index based on a preoperative plan for the eye;
   change at least one piece of information of the position, the direction, or the size of the index in accordance with the operative field image at a start of surgery by comparing the preoperative image with the operative field image at the start of surgery; and
   accumulate the operative field image at the start of surgery and at least one piece of information of the changed position, direction, or size of the index.

3. The image processing apparatus according to claim 2, wherein the processing circuitry is configured to:
   track the eyeball in the operative field image of real time by comparing the operative field image at the start of surgery with the real time operative field image;
   output relationship information indicating a relationship between at least one piece of information of a position, a direction, or a size of the eyeball in the real time operative field image and at least one piece of information of the changed position, direction, or size of the index;
   arrange the boundary based on at least one piece of information of the changed position, direction, or size of the index; and
   change at least one of a position, a direction, or a size of the boundary in the real time operative field image so as to eliminate a change in at least one of the position, the direction, or the size of the boundary with respect to the eyeball in the operative field image at the start of surgery based on the relationship information.

4. The image processing apparatus according to claim 1, wherein the processing circuitry is configured to change the plurality of regions by coordinate transformation such that at least one of the position, the direction, or the size of the boundary is changed based on a tracking result of the eyeball.

5. The image processing apparatus according to claim 1, wherein the processing circuitry is configured to change a boundary line indicating the boundary based on a tracking result of the eyeball.

6. The image processing apparatus according to claim 1, wherein processing circuitry is configured to perform processing of adjusting a same type of parameters for two or more of the plurality of regions.

7. The image processing apparatus according to claim 1, wherein the processing circuitry is configured to perform processing of adjusting different types of parameters for two or more of the plurality of regions.

8. The image processing apparatus according to claim 1, wherein the processing circuitry is configured to:
   generate the display image as either one of a display image for stereoscopic left eye or a display image for stereoscopic right eye, or
   generate the display image as a display image for stereoscopic left eye and a display image for stereoscopic right eye, respectively.

9. The image processing apparatus according to claim 8, wherein the processing circuitry is configured to:

track the eyeball in the operative field image for one or both of stereoscopic left eye and stereoscopic right eye;

change at least one of the position, the direction, or the size of the boundary based on a tracking result of the eyeball for one or both of stereoscopic left eye and stereoscopic right eye; and generate a display image for the stereoscopic left eye and a display image for the stereoscopic right eye.

10. The image processing apparatus according to claim 8, wherein the processing circuitry is configured to set the boundary at a same position in the display image for the stereoscopic left eye and the display image for the stereoscopic right eye.

11. The image processing apparatus according to claim 8, wherein the processing circuitry is configured to generate the display image in which at least one of the position, the direction, or the size of the boundary is different between the display image for the stereoscopic left eye and the display image for the stereoscopic right eye so as to indicate at least one of the specific position, the specific direction, or the specific size.

12. The image processing apparatus according to claim 8, wherein the processing circuitry is configured to:

shift the display image for the stereoscopic left eye and the display image for the stereoscopic right eye based on depth information of desired localization of a three-dimensional image including the display image for the stereoscopic left eye and the display image for the stereoscopic right eye; and generate the three-dimensional image.

13. The image processing apparatus according to claim 1, wherein the processing circuitry is configured to change a display mode of any or all of the plurality of regions according to a time period.

14. The image processing apparatus according to claim 1, wherein the processing circuitry is configured to generate the display image in which the boundary indicates a plurality of the specific positions.

15. The image processing apparatus according to claim 1, wherein the processing circuitry is configured to change a size of any or all of the plurality of regions according to a size change of the eyeball.

16. The image processing apparatus according to claim 1, wherein the processing circuitry is configured to change a size of any or all of the plurality of regions according to a time period.

17. The image processing apparatus according to claim 1, wherein the display mode of each of the plurality of regions differs depending on a difference in luminance of each of the plurality of regions.

18. The image processing apparatus according to claim 17, wherein the specific position is a toric axis arrangement position of an intraocular lens, and the processing circuitry is configured to change luminance of each of the plurality of regions such that the boundary indicates the toric axis arrangement position.

19. The image processing apparatus according to claim 1, wherein the specific position is any one of a toric axis arrangement position of an intraocular lens, an incision position for forceps insertion, an incision position of anterior capsule incision, an eye axis position, a corneal limbus center, a pupil center, a preoperative pupil center, a visual axis position, and an anterior capsule incision edge center.

20. An image processing method performed by an image processing apparatus, the method comprising:

receiving an operative field image for an eye of a patient;

tracking an eyeball in the operative field image;

setting a plurality of regions having different display modes for the operative field image;

generating a display image in which a boundary of the plurality of regions indicates at least one of a specific position, a specific direction, or a specific size with respect to the eye;

changing a display mode of any or all of the plurality of regions based on a tracking result of the eyeball;

changing at least one of a position, a direction, or a size of the boundary;

weakening an intensity of processing for any or all of the plurality of regions as a distance from the boundary increases; and when the eyeball deviates from tracking of the eyeball, maintaining a last display image before the eyeball deviates.

21. A surgical microscope system comprising:

a surgical microscope that obtains an operative field image for an eye of a patient;

an image processing apparatus that generates a display image; and a display device that displays the display image, wherein the image processing apparatus includes processing circuitry configured to:

receive the operative field image;

track an eyeball in the operative field image;

set a plurality of regions having different display modes for the operative field image;

generate the display image in which a boundary of the plurality of regions indicates at least one of a specific position, a specific direction, or a specific size with respect to the eye;

change a display mode of any or all of the plurality of regions based on a tracking result of the eyeball;

change at least one of a position, a direction, or a size of the boundary;

weaken an intensity of processing for any or all of the plurality of regions as a distance from the boundary increases; and when the eyeball deviates from tracking of the eyeball, maintain a last display image before the eyeball deviates.

* * * * *